United States Patent
Kliger et al.

(10) Patent No.: US 11,184,359 B2
(45) Date of Patent: Nov. 23, 2021

(54) AUTOMATED ACCESS CONTROL POLICY GENERATION FOR COMPUTER RESOURCES

(71) Applicant: MICROSOFT TECHNOLOGY LICENSING, LLC, Redmond, WA (US)

(72) Inventors: Ben Kliger, Ramat Gan (IL); Yotam Livny, Gadera (IL); Ram Haim Pliskin, Rishon Lezion (IL); Roy Levin, Haifa (IL); Mathias Abraham Marc Scherman, Tel Aviv (IL); Moshe Israel, Herzelia (IL); Michael Zeev Bargury, Ramat Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 167 days.

(21) Appl. No.: 16/059,393

(22) Filed: Aug. 9, 2018

(65) Prior Publication Data
US 2020/0053090 A1 Feb. 13, 2020

(51) Int. Cl.
*G06F 17/00* (2019.01)
*H04L 29/06* (2006.01)
(Continued)

(52) U.S. Cl.
CPC ........... *H04L 63/102* (2013.01); *G06F 21/50* (2013.01); *G06K 9/6256* (2013.01);
(Continued)

(58) Field of Classification Search
CPC . H04L 29/08819; H04L 63/20; H04L 63/102; H04L 63/10; H04L 63/101;
(Continued)

(56) References Cited

U.S. PATENT DOCUMENTS 9,853,993 B1   12/2017  Zhou et al.
9,984,386 B1 *  5/2018  Bhatia .................... G06Q 30/01
(Continued)

FOREIGN PATENT DOCUMENTS

CN       105306475 B     6/2018

OTHER PUBLICATIONS

Musca et al, Secure Access to Cloud Resources, Oct. 30, 2013, IEEE, pp. 554-558. (Year: 2013).*

(Continued)

*Primary Examiner* — Luu T Pham
*Assistant Examiner* — Jenise E Jackson
(74) *Attorney, Agent, or Firm* — Newport IP, LLC; Jacob P. Rohwer

(57) ABSTRACT

Methods, systems, and media are shown for generating access control rules for computer resources involving collecting historical access data for user accesses to a computer resource and separating the historical access data into a training data set and a validation data set. An access control rule is generated for the computer resource based on the properties of the user accesses to the computer resource in the training data set. The rule is validated against the validation data set to determine whether the rule produces a denial rate level is below a threshold when the rule is applied to the validation data set. If the rule is valid, then it is provided to an administrative interface so that an administrator can select the rule for application to incoming user requests.

17 Claims, 13 Drawing Sheets

(51) Int. Cl.
*G06K 9/62* (2006.01)
*G06F 21/50* (2013.01)
*G06N 20/00* (2019.01)

(52) U.S. Cl.
CPC ......... *G06K 9/6262* (2013.01); *G06K 9/6278* (2013.01); *G06N 20/00* (2019.01); *H04L 63/20* (2013.01)

(58) Field of Classification Search
CPC ............. H04L 63/107; G04L 29/06823; G06F 3/0605; G06F 21/62; G06F 21/604; G06F 21/50; G06F 2221/034; G06F 21/316; G06F 21/335; G06F 21/45; G06F 2221/2141
USPC ............................................................ 726/1
See application file for complete search history.

(56) References Cited

U.S. PATENT DOCUMENTS

| | | | |
|---|---|---|---|
| 10,834,135 B1* | 11/2020 | Chhabra | ............... H04L 63/108 |
| 2018/0288063 A1* | 10/2018 | Koottayi | ................ G06F 15/76 |
| 2020/0364627 A1* | 11/2020 | Qin | ...................... G06Q 10/047 |

OTHER PUBLICATIONS

Cheng et al., Relationship-Based Access Control for Online Social Networks: Beyond User-to-User Relationships, Sep. 5, 2012, IEEE, pp. 646-655. (Year: 2012).*

"Test Set", Retrieved From: https://web.archive.org/web/20170905221925/https://en.wikipedia.org/wiki/Test_set, Sep. 5, 2017, 4 Pages.

"International Search Report and Written Opinion Issued in PCT Application No. PCT/US19/039657", dated Sep. 23, 2019, 11 Pages.

* cited by examiner

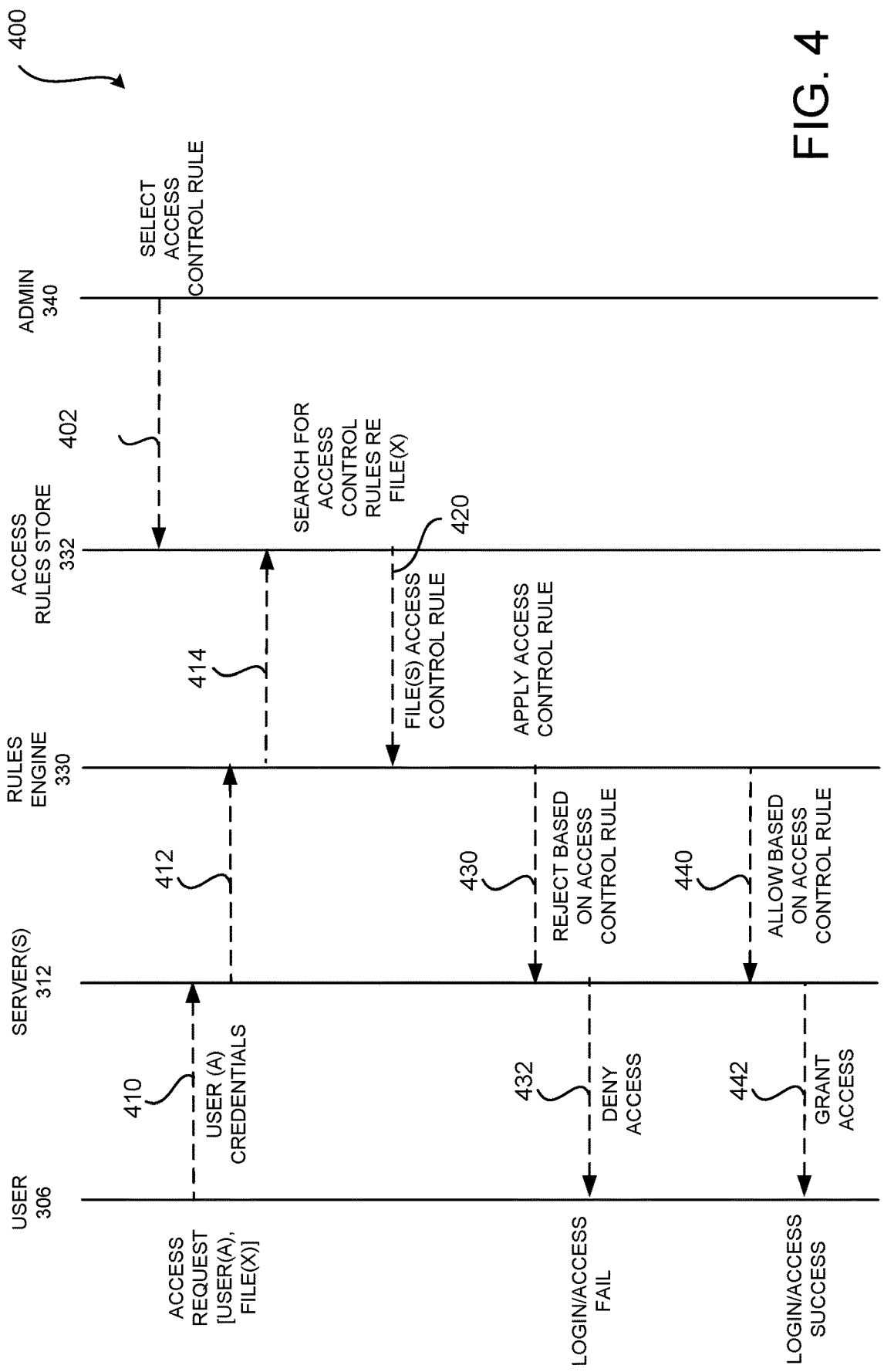

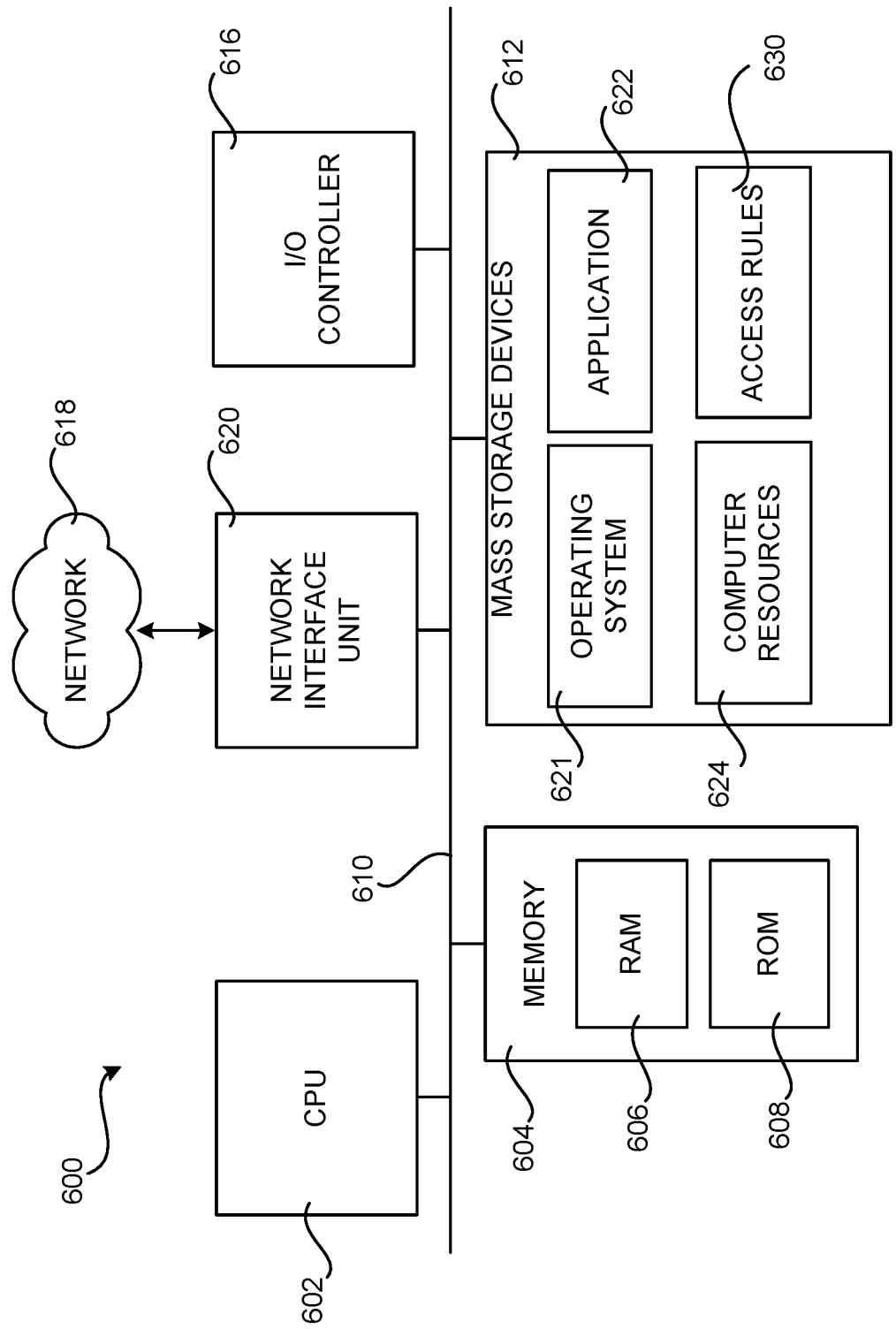

AUTOMATED ACCESS CONTROL POLICY GENERATION FOR COMPUTER RESOURCES

BACKGROUND

In cyber security, malicious actors or attackers frequently attempt to penetrate computer systems to access or corrupt files with sensitive information or to drop malicious files on a machine's file system, using legit (vulnerable) files for malicious use or accessing to files with sensitive information. For example, financial or personal information may be taken and sold or utilized to steal funds. Important information for public and private entities can be stolen, corrupted or destroyed.

To reduce the vulnerability of computer resources, e.g. the attack surface, an organizational security officer or administrator can restrict access to the computer resources of machines, such as their file systems and services. However, existing solutions typically require manual configuration by an administrator for each computer resource and user pair. As a result, an operator of a large number of machines typically needs to (1) understand what are the machines which need to be hardened, (2) understand what is the right configuration for each one of the these machines, (3) configure each machine separately, (5) keep tracking system changes on all of the machines and (6) if a change in the permission model is required, the owner needs to access each machine separately to change the rules on each one of the them. Due to this management overhead, users often do not to fully utilize this capability even though they are adding more risk to their environment.

In addition, it can be difficult for an organization or administrator to efficiently create tailored policies to limit a user's access only to the files they need. Creating tailored policies requires a lot of manual work analyzing files and system logs. In many cases, customers don't have the required data or the required knowledge in order to do so. In other cases, they don't have the resources since this task may take a lot of time because of the large scale of data. Then, after activating their policies, more manual work is required in order to maintain a tailored policy, such as an access whitelist, as users and use patterns change over time.

It is with respect to these and other technical challenges that the disclosure made herein is presented.

SUMMARY

Limiting access to computer resources using access control rules can significantly decrease the attack surface, e.g. the exposure of the computer resources to attackers, and restrict an attacker's penetration or movement within a system. However, manually creating access control rules by an administrator is typically time consuming and can overlook properties of user access to computer resources that may not be apparent. As a consequence, effective access control rules may not be configured or are incompletely configured leaving computer resources more vulnerable to attack.

The present technology reduces the attack surface for a system or machine by automatically generating access control rules to limit access to computer resources based on historical user access data. For example, the historical access data can include frequent access requests to a computer resource by a particular user and an access control rule is generated that permits access by the particular user but denies access to other users. When access to a computer resource is limited to users who normally access the computer resource, the vulnerability of the computer resource is reduced. Other technical benefits not specifically mentioned herein can also be realized through implementations of the disclosed subject matter.

In order to realize the technical benefits mentioned briefly above, certain implementations of the technologies disclosed herein can automatically generate access control rules for controlling access to computer resources based on historical access data for user accesses to a computer resource. The historical access data is separated into a training data set and a validation data set. An access control rule is generated for the computer resource based on one or more properties of the user accesses to the computer resource in the training data set. The access control rule is applied to the validation data set to determine a denial rate level. If the denial rate level is below a threshold parameter, then the access control rule is determined to be valid and the access control rule is provided to an administrative interface for presentation to an administrator for review and selection.

In some implementations, the access control rule is validated by applying the access control rule to user access requests in multiple subsets of the validation data set that are directed toward the computer resource to obtain a denial rate level for each one of the multiple of subsets. The denial rate level for each subset is scored using threshold parameter value corresponding to the subset, which, in some examples, can reflect a weighting for the subset. The scores for each subset are collected to determine a cumulative score and the access control rule is determined to be valid if the cumulative score is below a threshold score value.

In certain implementations, the threshold parameter value is determined based on one of or a combination of a preset value, an algorithmically determined value, or a value received from an administrator. In some implementations, the access control rule for the computer resource is generated based on analysis of the properties of the user accesses to the computer resource in the training data set utilizing one or a combination of machine learning, statistical analysis, Bayesian analysis, histographical analysis, and clustering of user characteristics.

As discussed briefly above, implementations of the technologies disclosed herein, can make computer systems less vulnerable to attack thereby avoiding inefficiencies due to compromised and corrupted computer resources. More secure computer systems will result in higher availability and efficiency of computer resources for authorized users of the computer systems. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a messaging diagram showing an illustration of message transfer in applying an access control rule in a server cluster;

FIG. 6 is a computer architecture diagram showing an illustrative computer hardware and software architecture for a computing device, such as the computing devices shown in FIGS. 1A, 1B, 2 and 3A, that can implement aspects of the technologies presented herein;

DETAILED DESCRIPTION

Figure 1A:
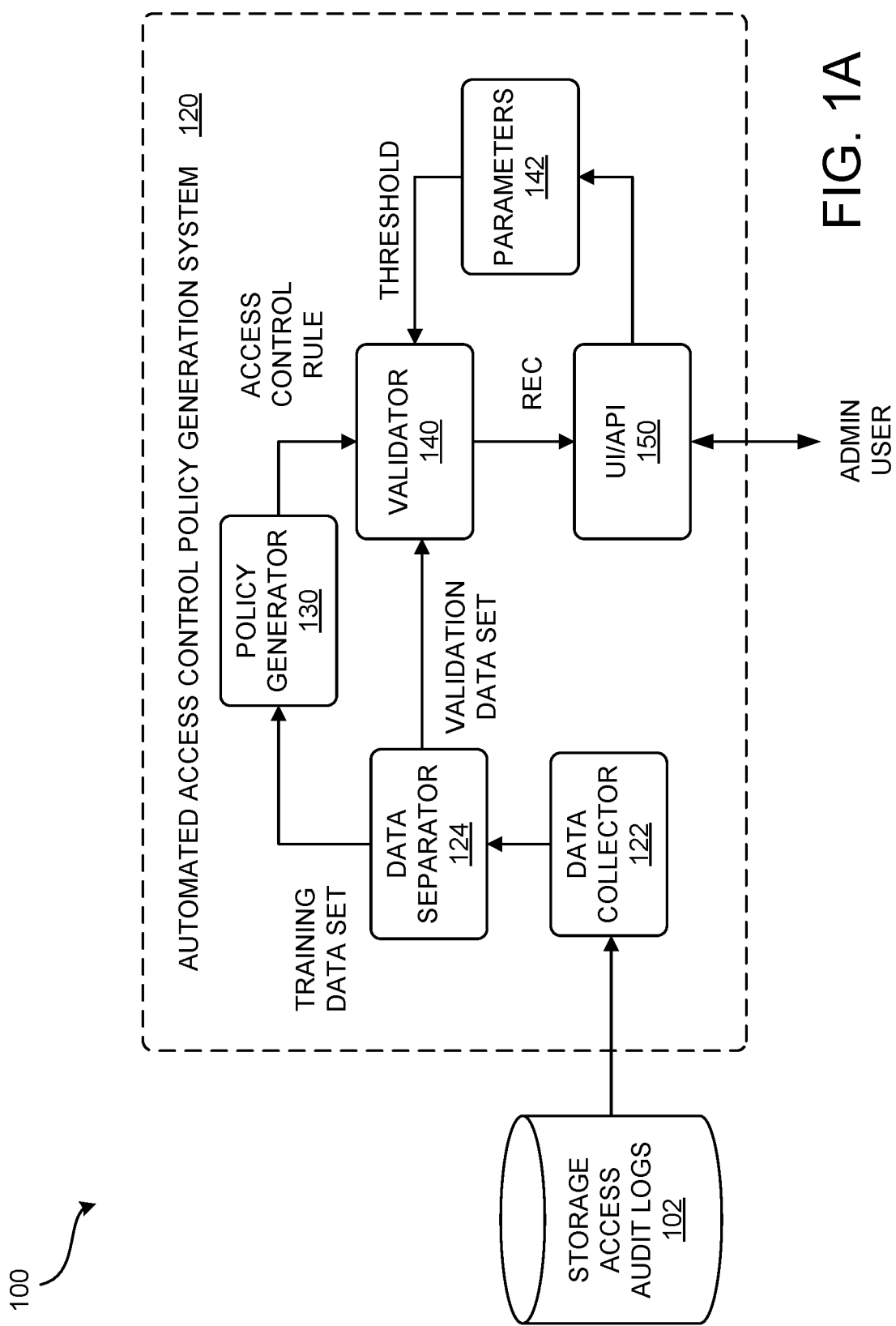
FIG. 1A is an architecture diagram showing an illustrative example of an automated access control policy generation system according to the disclosed technology.

The following detailed description is directed to an automatic access control policy generation system for defining and applying access rules to control access to computer resources. As discussed briefly above, the extensive number of users and devices that can access a computer resource creates an attack surface that is managed in the disclosed technologies. The security of computer resources can be improved by the disclosed approach to automatically generating an access control rule for a computer resource based on historical access data to reduce an attack surface of the computer resource. The improved computer resource security of the disclosed approach can yield significant benefits to administrators of computer resources, such as administrators of local and remote computer systems, in terms of protection of resources and data, which improves resource utilization, availability and overall performance.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several figures, aspects of an automatic access control policy generation system that provides improved security will be described.

FIG. 1A is an architecture diagram showing an illustrative example of an automated access control policy generation system 120 according to the disclosed technology. The automated access control policy generation system 120 includes data collector 122, which, in this example, collects trace events of attempts by users to access computer resources, such as storage files. In one example, for each access attempt, data collector 122 collects a user identifier for a user making the access attempt, a file identifier for a file accessed by the user, and an action permission level for the access, e.g. the user read, updated, or deleted the file. The data collector can keep historical data pertaining to access requests for a predefined period of time, such as the past thirty days, an algorithmically determined period of time, or multiple periods of time, depending upon the desired implementation.

Data separator 124 receives the historical data and, in one example, separates the historical data into a training data set and a validation data set. The training data set is used to generate an access control rule for controlling access to a computer resource, such as a recommended policy for a storage permission model of a client or server device. The validation data set is used to test the access control rule and to validate the access control rule before presentation to an administrative user for consideration and selection.

The data can be separated into the training and validation sets in a variety of ways. For example, the training data set is collected during a first time period and the validation data set is collected during a second time period, where the first time period is earlier than the second period. In another example, the training data set is obtained by sampling the historical data with a first sampling algorithm, such as sampling every other access attempt, and the validation data set is obtained by sampling the historical data with a second sampling algorithm, such as a pseudo random sampling pattern. A variety of approaches can be utilized with the disclosed technology.

Policy generator 130 generates an access control rule based on the training data set received from data separator 124. An access control rule for a particular computer resource, such as a storage file or folder in mass storage, can be generated based on the historical accesses to the computer resource in the training data set. An access control rule generated for a file can define the users allowed to access the file and the actions permitted for each of the users. For example, if a user accesses a file more than a threshold number of times in the training data set, e.g. ben@organization.edu accesses file XYZ for read and write actions more than three times, then the access control rule generated permits the user to access the file, e.g. ben@organization.edu can read or write storage file XYZ.

The policies generated by policy generator 130 can be determined using a variety of approaches, such as machine learning or statistical methods. For example, a Bayesian approach applied to the training data set can be utilized to generate the policy. In another example, a histographical, e.g. histogram, analysis of the training data set can be utilized to generate the access control rule.

In still another example, an analysis of clustering in the training data set based on user characteristics, such as users associated with a particular organization, e.g. a company or university, or department, e.g. engineering, maintenance or human resources, can be utilized. A simplified example of an access control rule determined based on clustering permits only a user that is part of a defined organization, e.g. human resources, to access a particular file. In some examples, different features of the user characteristics can be scored, a threshold value and weight applied to each feature score, and the weighted feature scores combined to produce a policy.

Note that access control rules can change over time based on changes in user access patterns. The disclosed technology can be utilized to automatically generate new access control rules to replace outdated rules. For example, if an existing access control rule for a computer resource results in a denial rate that exceeds a threshold, then the automated access control policy generation approach can be activated to generate a different access control rule that reflects more recent pattern of user access to the computer resource.

Validator 140 receives a policy from policy generator 130 and applies the access control rule to the validation data set received from data separator 124. Validator 140 evaluates the impact on access to a computer resource caused by applying the access control rule and determines whether to present the access control rule to an administrative user via User Interface (UI) or Application Program Interface (API) 150. In some examples, the evaluation performed by validator 140 can utilize one or more threshold parameters from parameters store 142. For example, if application of the access control rule for a computer resource results in a rejection rate for legitimate user access attempts in the validation data set that exceeds a threshold level, then validator 140 rejects the access control rule. In the example of FIG. 1A, an administrative user can determine the values of parameters stored in parameters store 142.

Figure 1B:
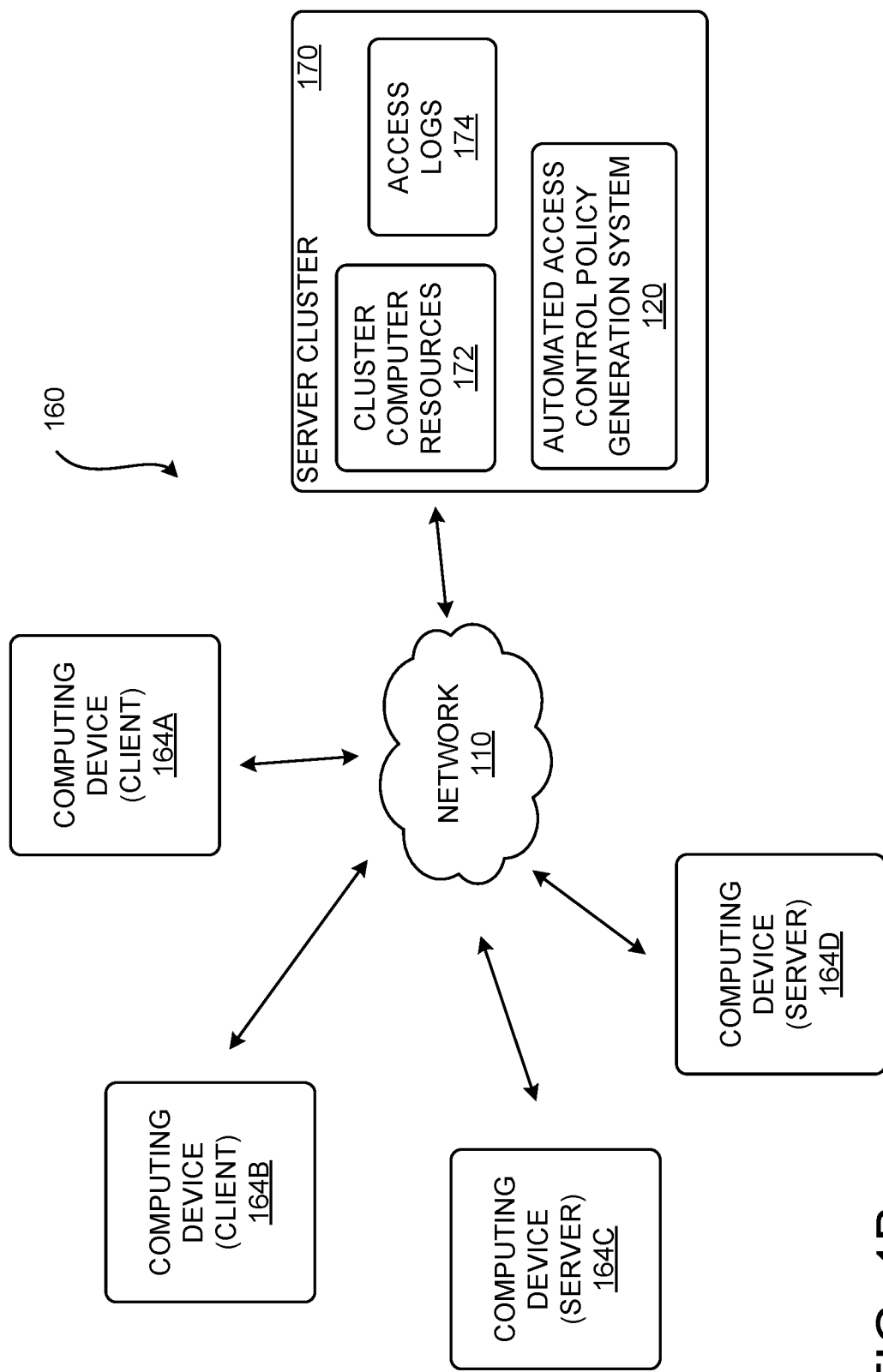
FIG. 1B is a network architecture diagram showing an illustrative example of a networked computing environment involving an automatic control policy generation system hosted on a server cluster of an automatic access control policy generation system.

FIG. 1B is a network architecture diagram showing an illustrative example of a network computing environment 160 involving user or server computing devices 164 in communication with a server cluster 170. In this example, computing devices 164A and 164B are client devices, such as personal computers, laptop computers, tablet computers, or smart phones, and computing devices 164C and 164D are servers, such as servers operated and maintained by a customer on their own premises. The client devices 164A and 164B and server devices 164C and 164D, in this example, are in communication with the resources of server cluster 170 through network 110.

In the example of FIG. 1B, server cluster 170 includes the automatic access control policy generation system 120 of FIG. 1A along with cluster computer resources, such as an email service module, a domain directory, message data, such as for text or voice messages, data storage for storing user application and operational data, and a credential data store for storing data related to credentials for user accounts. The server cluster 170, in this example, also includes access logs 174 that store historical information regarding access by users to the computer resources 172. The access control policy generation system 120 generates access control policies for the computer resources of server cluster 170.

Figure 2:
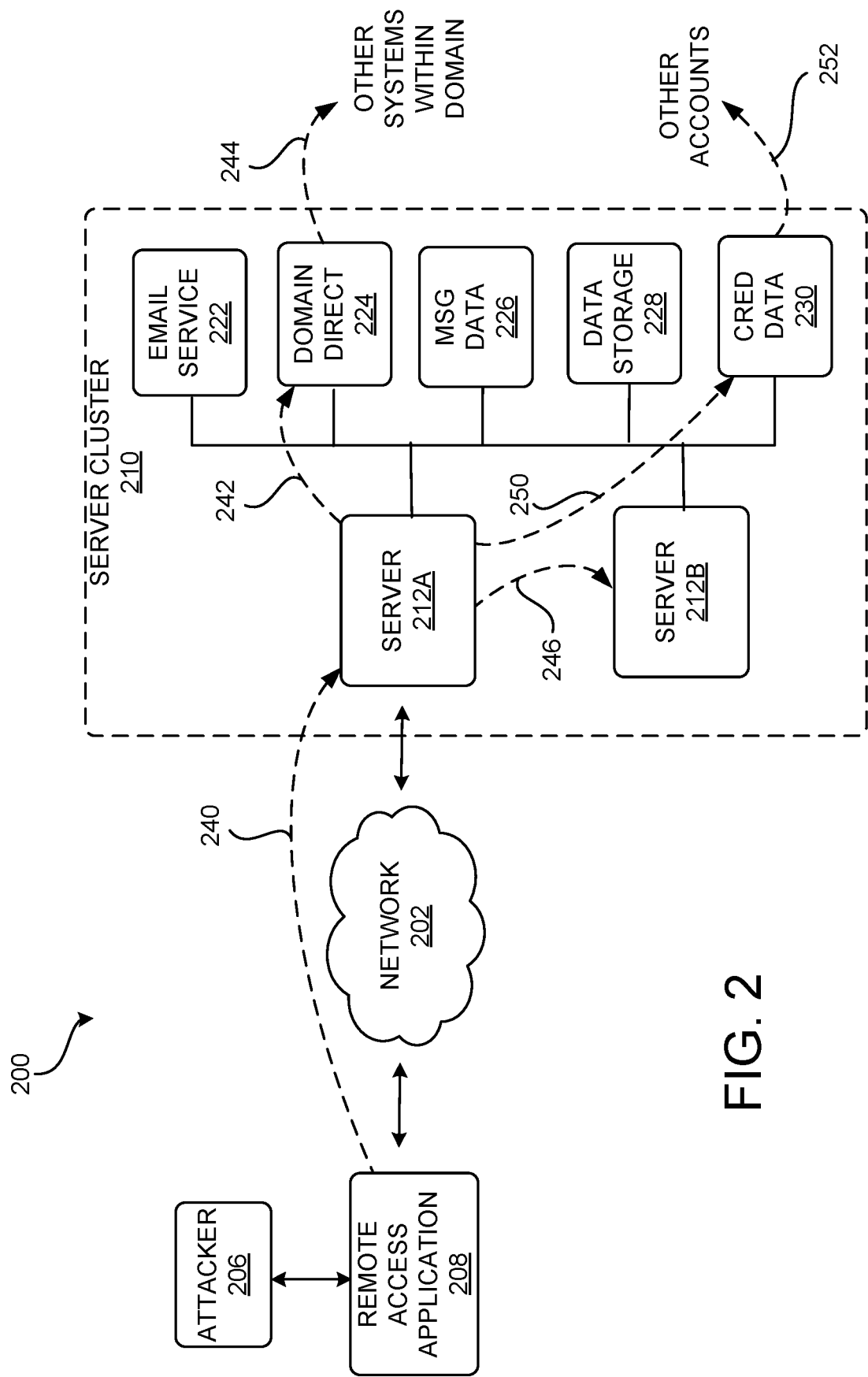
FIG. 2 is a software architecture diagram showing an illustrative example of a lateral attack in a server cluster for an automatic access control policy generation system.

FIG. 2 is a software architecture diagram illustrating an example of a lateral attack in a server cluster 210. Server cluster 210 is configured to provide services to users, such as email messaging, text messaging, remote applications, remote storage, etc., through network 202. For example, a user of a user computing device 164 in FIG. 1B who has a user account can login to server cluster 210 through network 202 in order to access email service 222.

However, an attacker can also utilize a computing device 206, such as a device 164 in FIG. 1B, with a remote access application 208, to attempt to login to or access server cluster 210 through network 202. As discussed briefly above, in a brute force attack technique, an attacker will repeatedly try to login to the server cluster 210 with a variety of user names or account identifiers and passwords with the intent of finding a set of credentials, e.g. user name and password combination, that allows them to access an account. Automated techniques have been developed by attackers to generate and attempt login with large numbers of user name and password combinations.

Note that the server cluster 210 discussed herein can be implemented using remote computer resources, e.g. the "cloud," to perform computer processing, such as to respond to user control inputs or other data input. In some cloud computing scenarios, some operations may be implemented in one set of computing resources, such as clients and servers, and other operations may be implemented in other computing resources, such as cloud resources provided by one or more compute resource providers. A cloud computing environment may include many computer resource provider systems offered by different providers. Examples of compute resource providers include the WINDOWS AZURE Service Platform from MICROSOFT CORPORATION, the AMAZON AWS from AMAZON, INC., the GOOGLE Cloud Platform from GOOGLE INC., and platform virtualization software and services from VMWARE, INC.

Once an attacker finds a valid user name and password combination that permits access to server cluster 210, the attacker typically accesses the computer resources of the server cluster to access information or introduce malicious code. For example, the attacker can use these credentials to laterally attack through the server cluster 210 attempting to access other system resources, such as other machines, systems, data and services. For example, the attacker may use remote access tools to move laterally through the server cluster or system 210 to harvest additional credentials, search for sensitive information, inject malware, and access other domains, devices and data.

For instance, an attacker may attempt to identify administrators in a network and the machines that the administrators access. They may also attempt to access data in domain controllers to discover accounts and obtain access to resources and files for the accounts. An attacker may also search for credentials for other users that are stored on computers that have already been compromised. The attacker may then use these stolen credentials to move laterally across users and resources to obtain administrative privileges in the network.

In the example of FIG. 2, attacker 206 using a remote access application 208 and using stolen user credentials gains access, at 240, to an account in server cluster 210 through server 212A. The attacker then uses the access obtained using the compromised account to access, at 242, domain directory 224 to identify other devices or systems within the domain for further attack, at 244. The attacker may also use the compromised account to laterally attack, at 246, another server 212B in cluster 210. Or the attacker may, at 250, gain access to credential data store 230 to obtain credentials for other accounts, at 252, which the attacker will use to access the data and resources for those accounts.

An attacker may also search communications data such as email messages in email service 222 or text or voice messages in message data 226 to obtain, for example, sensitive information, such as compromising communications, or additional user account names to use in additional brute force attacks. The attacker may obtain access through a compromised account to sensitive data in data storage 228, such as documents, personal records, or financial transactions.

The accesses likely to be made by the attacker using stolen user credentials will often involve an abnormal pattern of user access requests. For example, user credentials for a user in an engineering department attempting to access a file belonging to a financial department. An access control rule for the file that is generated based on historical access data can block such an abnormal pattern of user access requests that may be caused by an attacker.

Figure 3A:
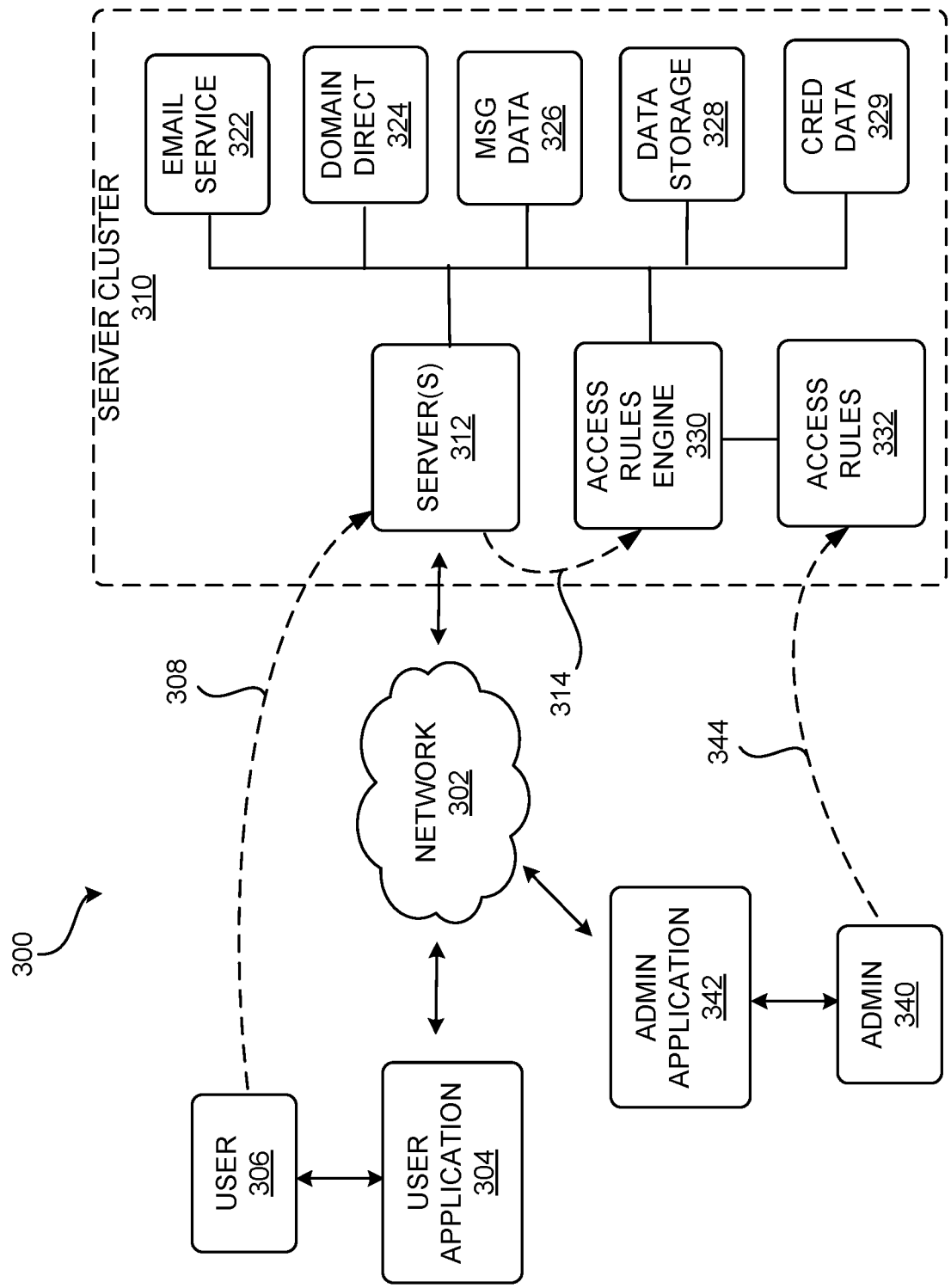
FIG. 3A is a software architecture diagram showing an illustrative example of a server cluster that utilizes access rules generated in accordance with the disclosed technology.

FIG. 3A is a software architecture diagram showing an illustration of a server cluster 310 with an access rules engine 330 that applies access control rules stored in access rules store 332 to user access requests. The access control rules in access rules store 332 can be generated by the automatic access control policy generation approach of the disclosed technologies. In this example, server cluster 310, like server cluster 210 of FIG. 2, includes email service 322, domain directory 324, message data 326, data storage 328 and credential data 329.

In the example of FIG. 3A, an access control rule generated by an automatic access control policy generation system, such as system 120 shown in FIG. 1A, is presented to an administrative user using an administrative user device 340 with an administrative application 342. Administrative application 342 enables administrator 340 to define the access control rules in access rules store 332. The administrative user selects the presented access control rule, which is stored in access rules store 332, at 344.

A user using user device 306 with user application 304 generates a computer resource access attempt, such as a file access attempt, at 308, to server cluster 310 via one of the servers 312 in the cluster. The computer resource access attempt includes a computer resource identifier, e.g. a file path name, and a user identifier, e.g. user name. The computer resource identifier and user identifier are submitted, at 314, to rules engine 330.

Rules engine 330 uses the computer resource identifier to determine if any access rules in access rules store 332 are relevant to the computer resource identifier. For example, an access control rule may be defined that pertains to the specific file referenced by the computer resource identifier or to a domain to which the computer resource identifier belongs. If an access control rule relevant to the computer resource identifier is found, rules engine 330 applies the relevant access control rule to the user identifier of the user's access attempt to determine whether a rule is triggered that requires the user's access attempt to be blocked. Note that additional properties or characteristics can also be considered with respect to an access attempt and an access control rule, such as a desired action identified in the access attempt and permitted actions for a user in the access control rule. Note that rules engine 330 can be a process executing within one of the servers 312 or other components of server cluster 310.

Figure 3B:
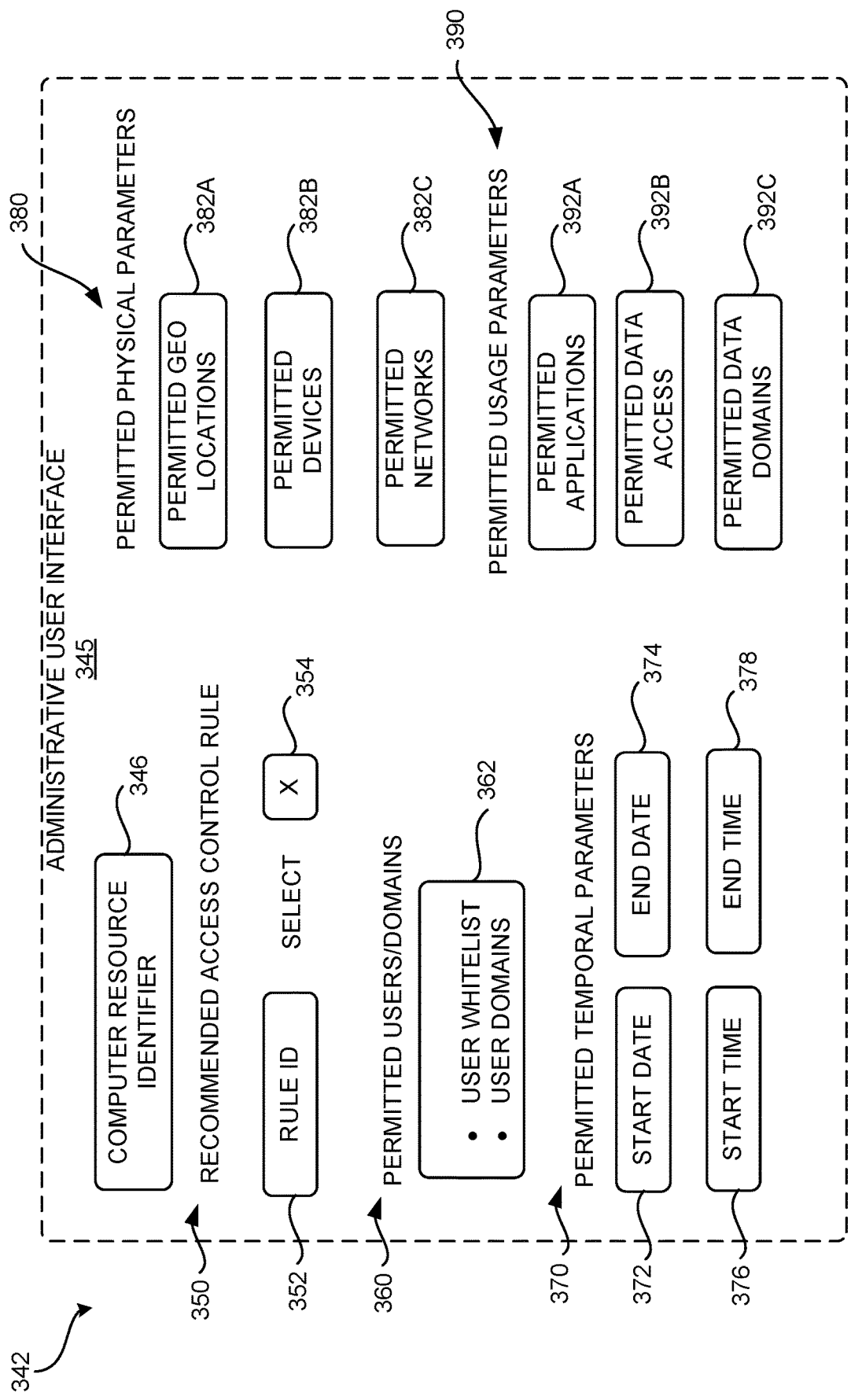
FIG. 3B is a schematic diagram showing an illustrative example of an administrator user interface for administering access rules in an automatic access control policy generation system utilizing an automatic control policy generation system in accordance with the disclosed technology.

FIG. 3B is a schematic diagram showing an illustration of an administrator user interface 345, such as can be presented to an administrator via administrator application 342 of FIG. 3A, that enables an administrator to be presented with an access control rule generated by the automatic access control policy generation system 120 of FIG. 1A and to select the presented access control rule for inclusion in the access rules store 332 of FIG. 3A.

In this example, interface 345 includes identifier field 346 that identifies the computer resource to which the access control rule pertains. Interface 345 also presents a recommended access control rule 350 for the computer resource identified in field 346 for consideration and selection by the administrator. Access control rule 350 is identified in rule identifier field 352 and selection field 354 is provided to enable the administrator to select access control rule 350 for activation and inclusion in access rules store 332 of FIG. 3A.

In this example, administrative user interface 345 presents proposed parameters for the recommended access control rule 350 as generated by access control policy generation system 120 shown in FIG. 1A. The values for the proposed parameters are determined from the characteristics of the access attempts in the training data set input to policy generator 130 in FIG. 1A.

Permitted users and domains 360 can be defined in field 362. For example, a whitelist of users or a whitelist of user domains that are permitted to access the computer resource can be defined. In another example, blacklists of users or domains that are prohibited from access can also be defined.

In some implementations, permitted temporal parameters 370 can be defined for the rule, such as a start date 372, an end date 374, a start time 376, and an end time 378. For example, a date range for permitted access can be defined in start date 372 and end date 374. In another example, the administrative user can populate these fields to define an effective date range for the rule. In addition, in this example, a time period during each day when access is permitted can be defined in start time 376 and end time 378. In one example, the rule recommends that access to the computer resource be permitted only during a specific period of each day, e.g. working hours. In various examples, these values can be generated based on the characteristics of the training data set, the characteristics pertaining to users or domains, e.g. organizations, or a combination of these or other factors.

In certain implementations, administrative user interface 345 can also include permitted physical parameters 380 defined for the rule, such as permitted geographical locations 382A, permitted devices 382B, or permitted networks 382C. For example, field 382A can define a geographic zone from which the computer resource can be accessed. Field 382B can define one or more devices from which the computer resource can be accessed. Field 382C can define one or more network domains from which the computer resource can be accessed.

For example, the computer resource identified in field 346 can have a geographic zone for the United States defined in field 382A and the computer resource can only be accessed from within the United States. In another example, an employee work computers or smartphones can be defined in field 382B such that the computer resource can only be accessed from these defined devices. In still another example, a corporate network domain can be defined in field 382C such that the computer resource can only be accessed from within the corporate network.

Administrative user interface 345 can also include permitted usage parameters 390. For example, field 392A can define specific applications that can be used to access the computer resource. Field 392B can be used to define limited data stores within the computer resource to which access is permitted. Field 392C can define one or more domains within the computer resource to which access is permitted.

For example, the computer resource identified in field 346 can be limited to access using a word processing application or a database application defined in field 392A. In another example, access can be limited to a specific database defined in field 392B. In still another example, access is limited to a corporate domain within the computer resource defined in field 392C.

Note that the proposed parameters described herein are examples only. Fewer, more or different types of parameters can be proposed in access control rule 350 presented to an administrative user using the interface. Also, some of the parameters can be reserved for definition by the administrative user instead of recommended by the automatic access control policy generation system 120. For instance, start date 372 and end date 374 can be administrative user defined values. It should be readily recognized that a wide variety of different parameters can be defined for a rule beyond those illustrated in the example of FIG. 3B without departing from the scope of the present disclosure.

FIG. 4 is a messaging diagram showing an illustrative example of a message transfer scenario 400 in a system where one or more access control rules have been generated by an automatic access control policy generation system and selected for application by an administrative user. In this example, at 402, administrator 340 utilizes administrative application 342 of FIG. 3A and administrative user interface 344 of FIG. 3B to select one or more access control rules relating to a computer resource, which are stored in access rules store 332 for application to user access requests.

At 410, user 306 in FIG. 3A, sends an access request to server 312 that includes an identifier for the user, e.g. USER(A), and a computer resource identifier for a computer resource, e.g. FILE(X). At 412, server 312 sends the computer resource identifier to rules engine 330. At 414, rules engine 330 uses the computer resource identifier to search access rules store 332 for one or more access control rules pertaining to the computer resource identifier, e.g. a rule with a matching the computer resource identifier or a rule with a domain identifier that pertains to the computer resource identifier. At 420, rules engine 330 obtains a relevant access control rule from access rules store 332 and applies the rule to the access request.

At 430, in this example, if the access request properties fail the rule, e.g. the access request does not fall within the permitted parameters defined in the access rule, rules engine notifies server 312 that the access attempt is rejected. At 432, server 312 sends a message to user 306 denying the access attempt. Note that multiple access rules may pertain to a computer resource and rules engine 330 can be designed in various ways to apply multiple rules to an access request, such as allowing the access if the access request meets the parameters of any one of the rules or only allowing access if the access request falls within the parameters of all of the rules.

If the properties of the access request pass the rule, e.g. the access request properties fall within the permitted parameters defined in the access rule, rules engine notifies server 312, at 440, that the access attempt is allowed. At 442, server 312 sends a message to user 306 granting the login or access attempt.

It will be appreciated that the architecture and messaging shown in the examples associated with FIGS. 3A and 4 are illustrative and do not limit the scope of the disclosed technology. One of skill in the art will readily recognize that other architectures and message protocols may be utilized in keeping with the disclosed technology.

Figure 5A:
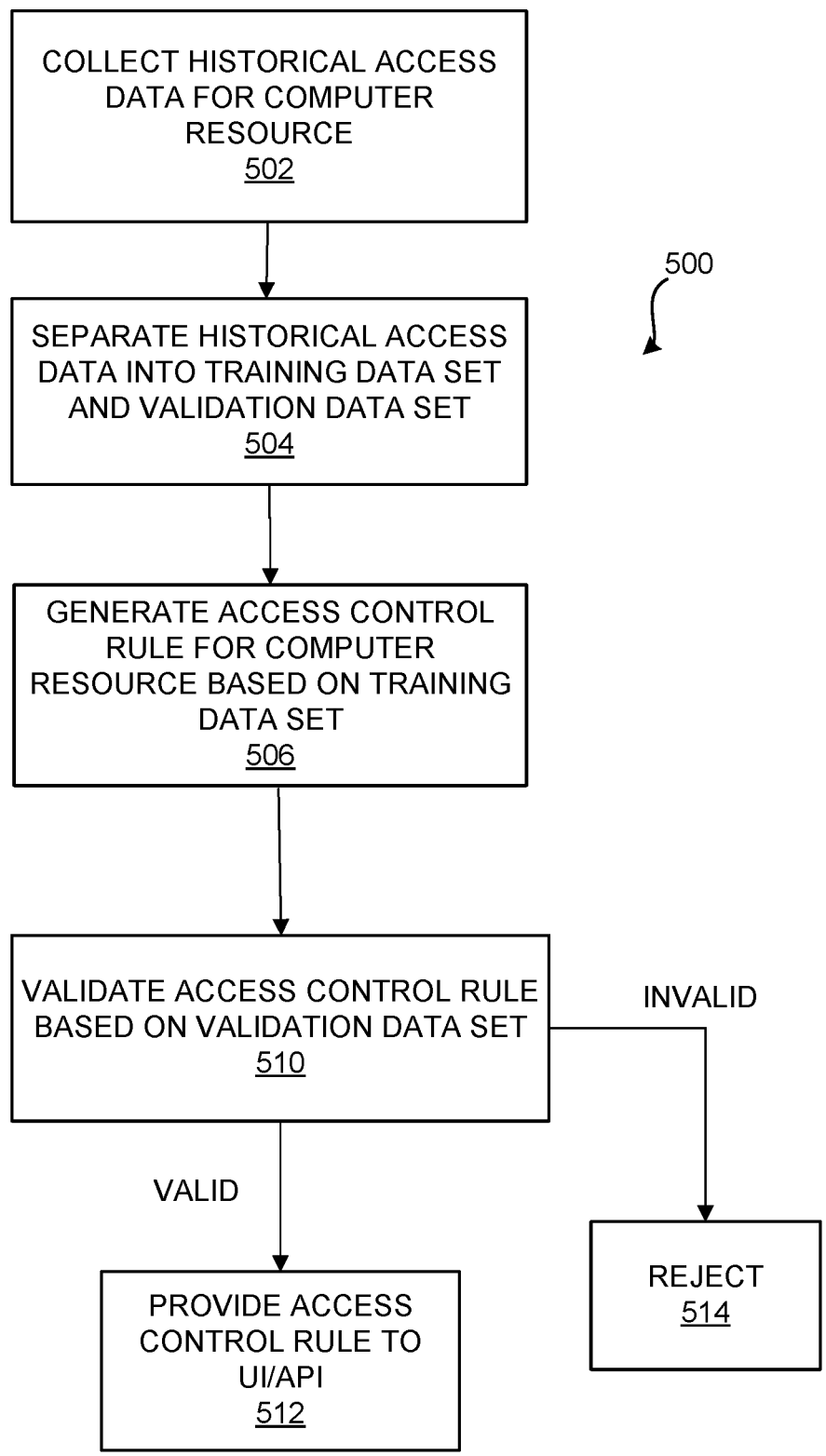
FIG. 5A is a flow diagram that illustrates aspects of a process for automatic control policy generation in accordance with the disclosed technology.

FIG. 5A is a flow diagram showing an example that illustrates aspects of a process 500 for generating an access control rule in the automatic access control policy generation system illustrated in FIG. 1A, according to one example disclosed herein. In this example, process 500 can be invoked in a variety of contexts, such as in background, and presented for consideration to administrator 340 utilizing administrative application 342 with administrative user interface 344 to select one or more access rules to be stored in access rules store 332.

At 502, historical access data for a computer resource is collected, e.g. by data collector 122. At 504, the historical access data is separated into a training data set and a validation data set, e.g. by data separator 124. At 506, the training data set is used to generate an access control rule for the computer resource, e.g. by policy generator 130.

At 510, the access control rule is validated by applying the rule to the validation data set. If the access control rule yields a denial of access rate, e.g. blockage rate, that exceeds a predetermined or selected level, then control branches to 514 and the access control rule is rejected as invalid. Otherwise, control branches to 512, where the access control rule is presented to an administrator through a user interface or API.

Figure 5B:
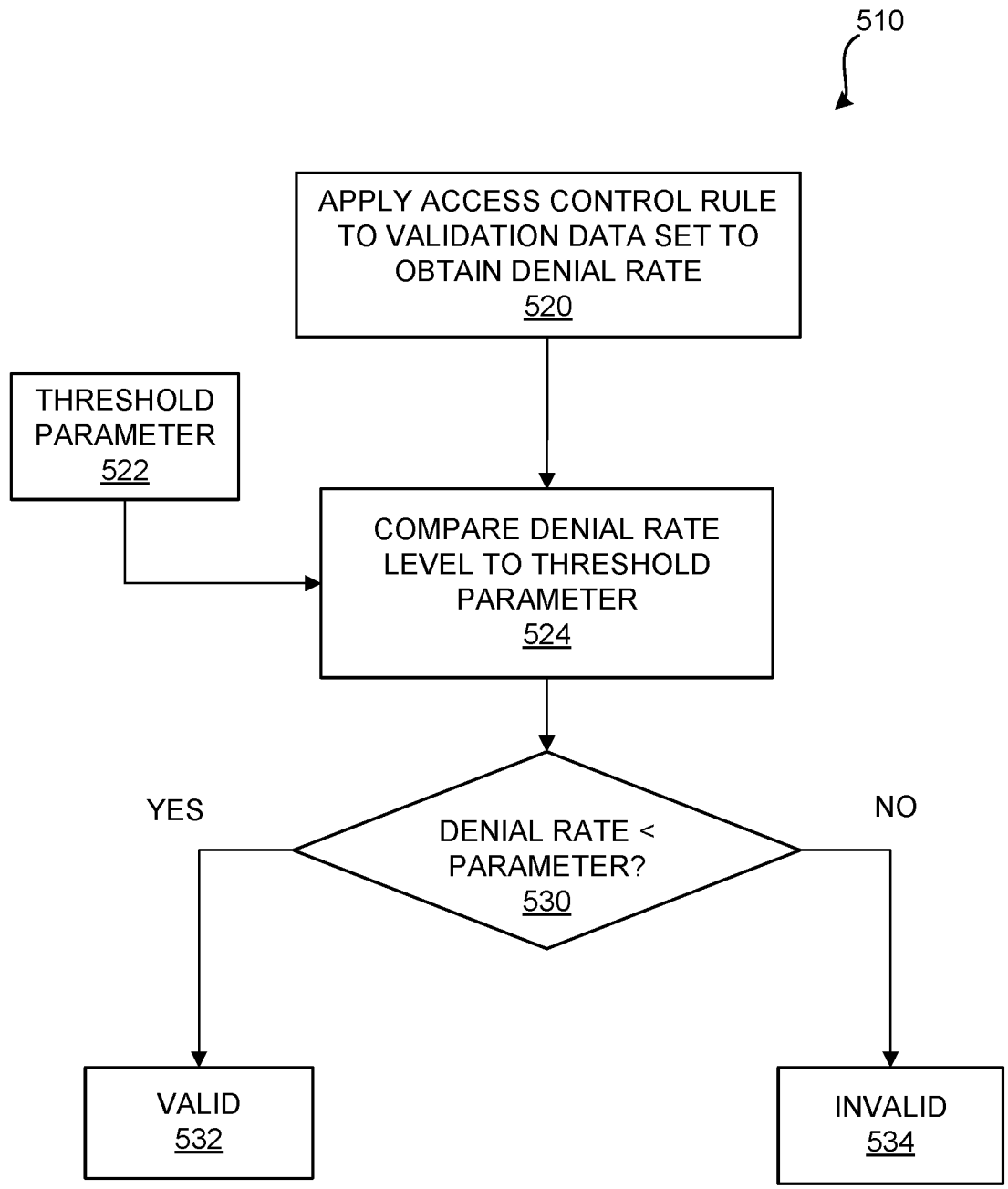
FIG. 5B is a flow diagram that illustrates an example of a process for validating an access control rule in the example of FIG. 5A in accordance with one aspect of the disclosed technology.

FIG. 5B is a flow diagram that illustrates one example of a process for validating an access control rule in operation 510 in the example of FIG. 5A in accordance with one aspect of the disclosed technology. At 520, the access control rule is applied to the validation data set to obtain an access request blockage level for the access control rule. At 524, the blockage level is compared to a threshold parameter 522. Examples for the threshold parameter are a predetermined value, an algorithmically defined value, or a value selected by an administrator. The parameter value or values can be stored in parameters store 142 of FIG. 1A and obtained therefrom.

At 530, if the blockage rate is lower than the parameter, then control branches to 532 to return a valid indication to process 500. If the blockage rate is no lower than the parameter, then control branches to 534 to return an invalid indication to process 500.

Figure 5C:
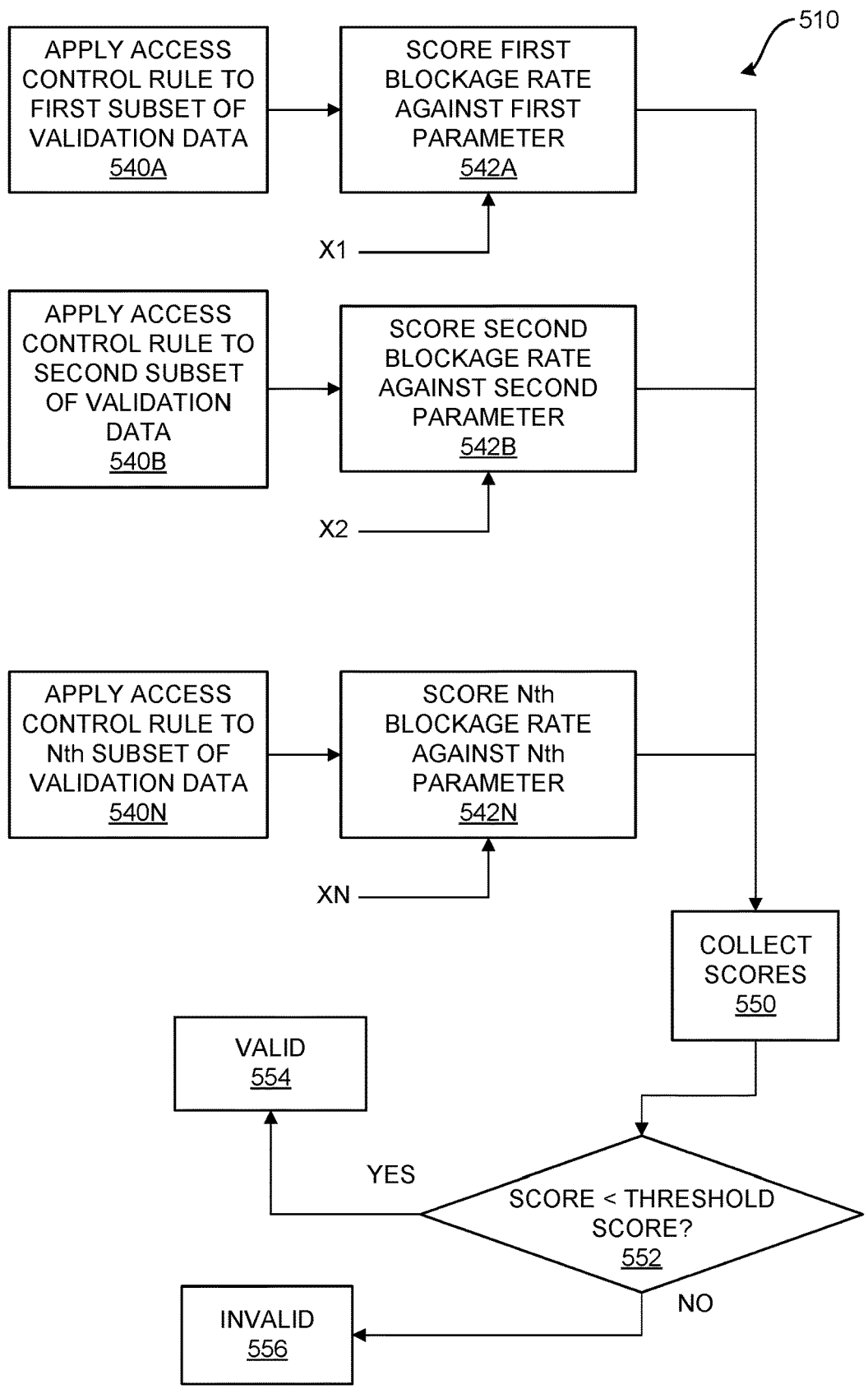
FIG. 5C is a flow diagram that illustrates another example of a process for validating an access control rule in the example of FIG. 5A in accordance with another aspect of the disclosed technology.

FIG. 5C is a flow diagram that illustrates another example of a process for validating an access rules in operation 510 in the example of FIG. 5A in accordance with one aspect of the disclosed technology, where the access control rule is applied to subsets of the validation data set and the blockage rates for the subsets are weighted and collected to determine a score.

At 540A, the access control rule is applied to a first subset of validation data, e.g. a subset of validation pertaining to a specific organization, and, at 542A, the resulting first blockage rate is scored against a first parameter X1, which can, in some examples, reflect a weight assigned to the first blockage rate.

At 540B, the access control rule is applied to a second subset of validation data, e.g. a subset of validation pertaining to an industry or activity related to the specific organization, and, at 542B, the resulting second blockage rate is scored against a second parameter X2, which can, in some examples, reflect a weight assigned to the first blockage rate. For example, X1 incorporates a higher weighting than X2 because X1 is more closely related to the organization that typically accesses the computer resource.

Multiple levels of subsets of data and associated parameters can be implemented based on design criteria and goals, as reflected at 540N, where the access control rule is applied to an Nth subset of validation data and, at 542N, the resulting Nth blockage rate is scored against an Nth parameter XN.

At 550, the scores for each of the subsets of validation data are collected and scored to produce a cumulative score. The cumulative score is compared to a threshold score value at 552. If the cumulative score is less than the threshold score, then, at 554, a valid indication is returned to process 500. Otherwise, at 556, an invalid indication is returned to process 500.

Figure 5D:
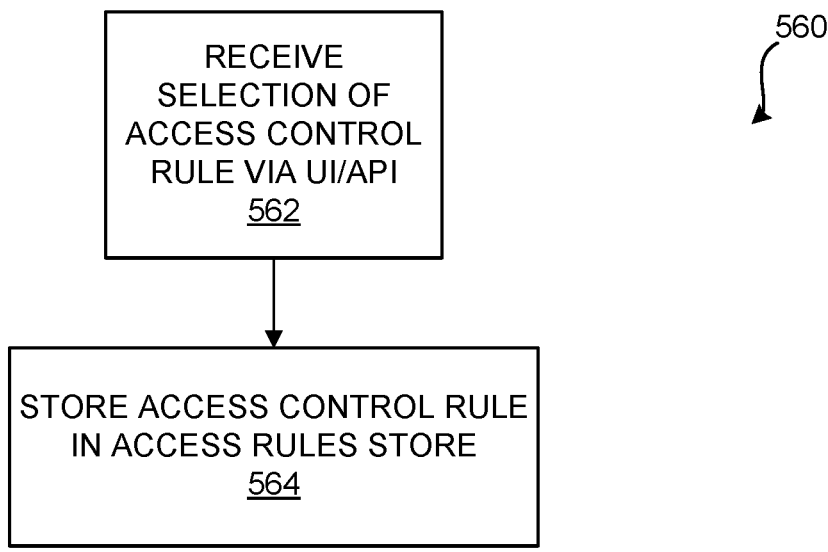
FIG. 5D is a flow diagram that illustrates an example of a process for receiving input from an administrative user selecting an access control rule generated by the automatic control policy generation of the disclosed technology.

As noted above, an access control is presented to an administrative user for consideration using a UI or API. FIG. 5D is a flow diagram that illustrates an example of a process 560 for receiving input from the administrative user selecting the access control rule generated by the automatic control policy generation system of the disclosed technology. At 563, an input signal selecting the access control rule is received from the administrator via a UI or API. At 564, in response to the administrator's selection of the access control rule, the rule is stored in access rules store 332 for application to user access requests.

Note that, in some implementations, the administrator can modify the access control rule presented to the administrator via the UI or API. In such implementations, the input signal received from the administrator at 563 can include the modifications to the access control rule made by the administrator or the modified access control rule.

Figure 5E:
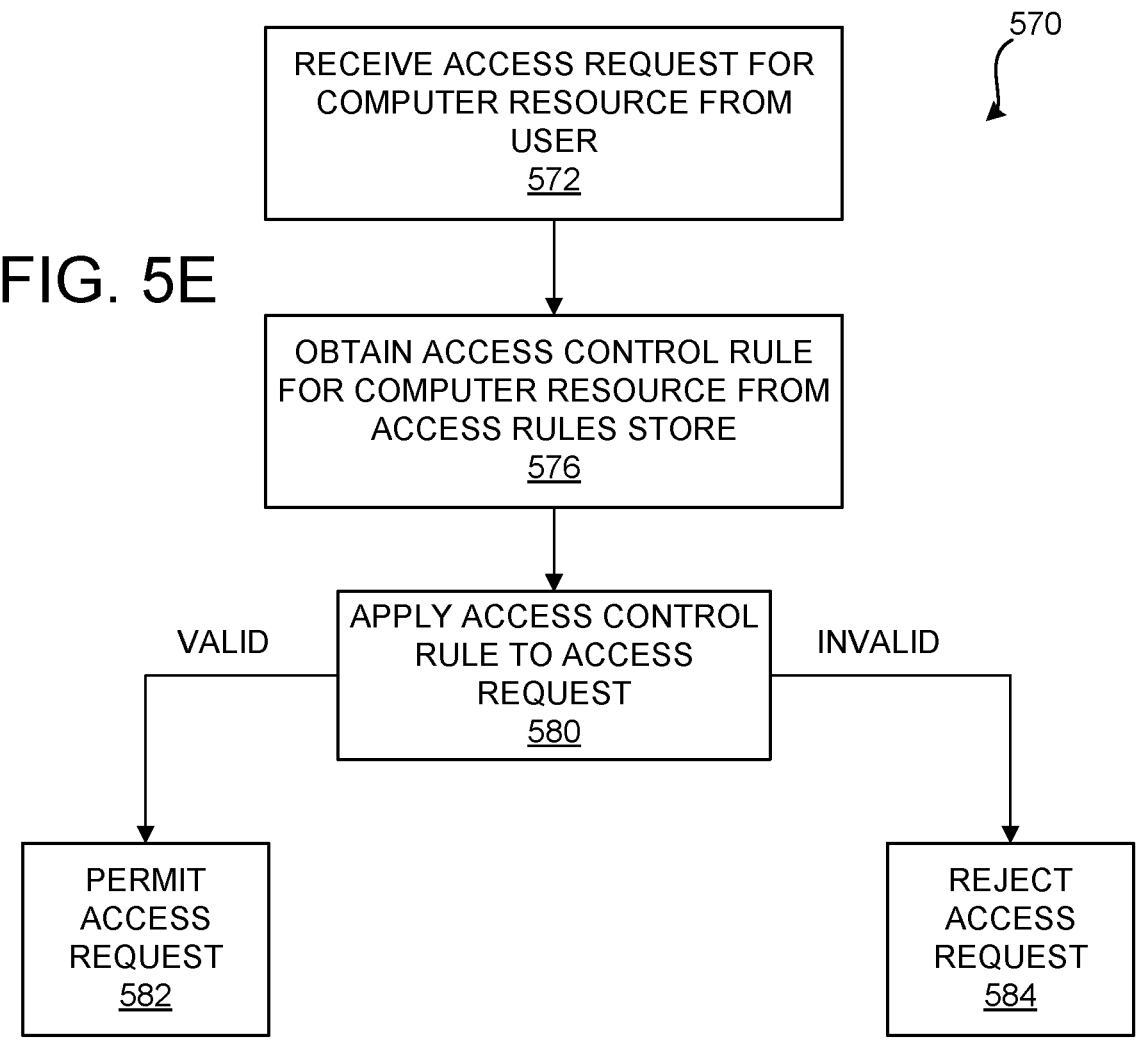
FIG. 5E is a flow diagram that illustrates an example of a process for applying an access control rule to an access request.

FIG. 5E is a flow diagram that illustrates an example of a process 570 for applying an access control rule to an access request. At 572, an access request for a computer resource is received from a user. At 576, access rules store 332, or a similar repository for the access control rules, is searched for an access control rule pertaining to the computer resource identified in the access request.

At 580, the access control rule is applied to the properties of the access request, e.g. the user identifier, date, time of day, geographic location, device, network, etc., for the access request. If the access request properties fall within the parameters of the access control rule, then access to the computer resource is permitted at 582. Otherwise, the access request is rejected at 584.

One of skill in the art will readily appreciate that a variety of approaches may be utilized to automatically generating access control rules based on historical access data and applying those rules without departing from the scope of the disclosed technology.

By automatically generating access control rules for computer resources based on historical access data, the disclosed technology facilitates more effective administration of access control rules. By making generation of access control rules simpler, an administrator is more likely to introduce access control rules to protect computer resources and reduce the exposure of the computer resources to malicious attack. For example, an administrator presented with an access control rule generated from historical access data that is at least partially defined can more easily consider and implement the access control rule.

It is to be appreciated that while the embodiments disclosed herein have been presented primarily in the context of automatically generating access control rules based on historical access data for limiting access requests to a computer resource. The technologies disclosed herein can be similarly applied to other contexts where similar functionality is utilized to automatically generate access control policy based on historical access data to control access to computer resources.

FIG. 6 is a computer architecture diagram that shows an architecture for a computer 600 capable of executing the software components described herein. The architecture illustrated in FIG. 6 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 600 shown in FIG. 6 can be utilized to implement a computing device capable of executing any of the software components presented herein. For example, and without limitation, the computing architecture described with reference to FIG. 6 can be utilized to implement the computing devices 104 or 164, or the modules of the automatic access control policy generation system 120 illustrated in FIG. 1A or some or all of the components of the systems 200 and 300 illustrated in FIGS. 2 and 3A and described above, which are capable of executing the various software components described above, such as the operations of the processes illustrated in FIGS. 5A-E.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, is stored in the ROM 608. The computer 600 further includes one or more mass storage devices 612 for storing an operating system 621, application programs 622, and other types of programs and data including, but not limited to, the computer resources 624 and access rules store 626. The computer resources 624 and access rules 626 can be stored in a different storage device from one another.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 618. The computer 600 can connect to the network 618 through a network interface unit 620 connected to the bus 610. It should be appreciated that the network interface unit 620 can also be utilized to connect to other types of networks and remote computer systems. The computer 600 can also include an input/output controller 616 for receiving and processing input from a number of other devices, including a keyboard, mouse, touch input, or electronic stylus (not shown in FIG. 6). Similarly, the input/output controller 616 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
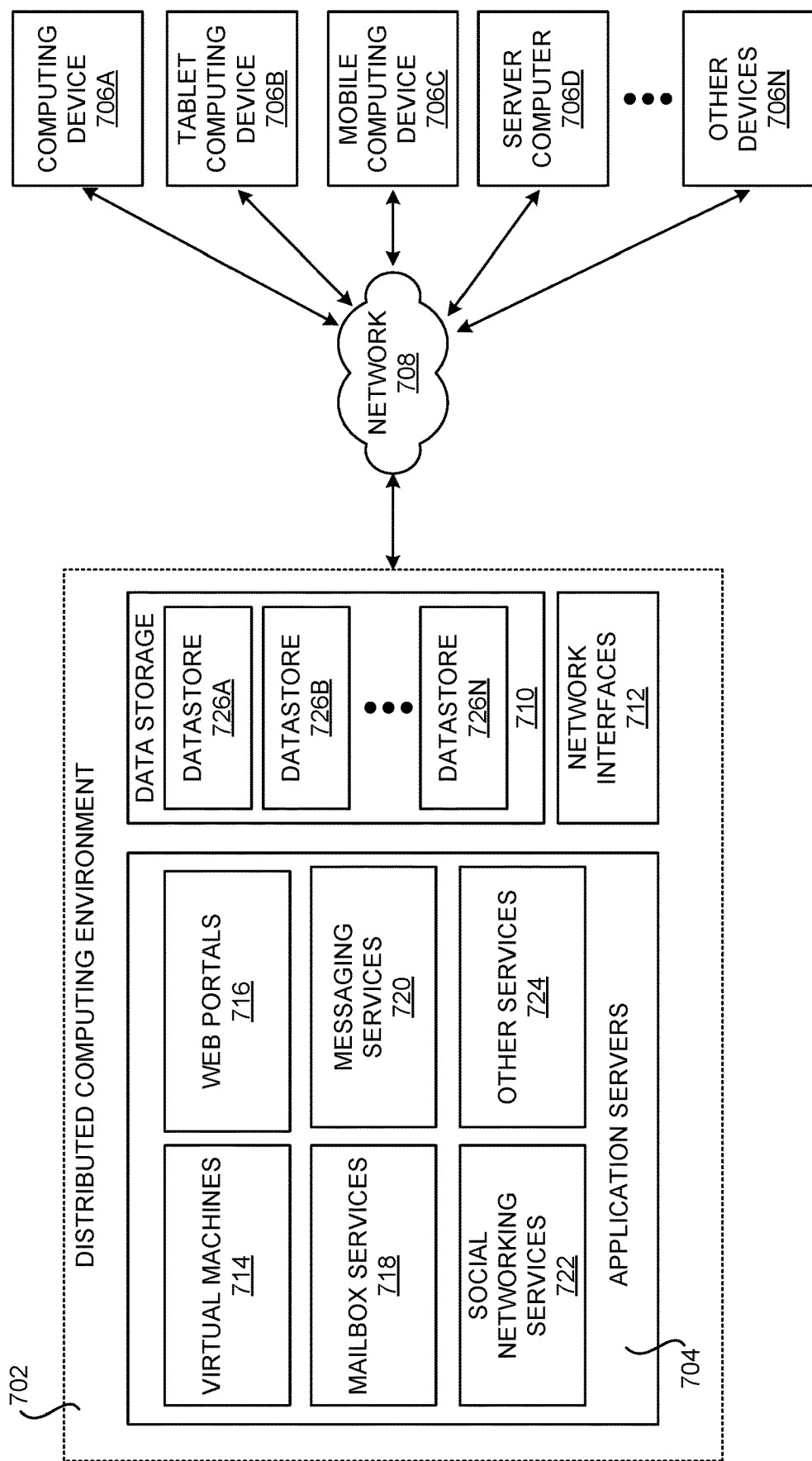
FIG. 7 is a network diagram illustrating a distributed computing environment capable of implementing aspects of the technologies presented herein.

FIG. 7 shows aspects of an illustrative distributed computing environment 702 that can provide cloud sourced resources, such as the resources for an automatic access control policy generation system, in which the software components described herein can be executed. Thus, the distributed computing environment 702 illustrated in FIG. 7 can be used to execute program code capable of providing the functionality described above with respect to FIGS. 1-5 and/or any of the other software components described herein.

According to various implementations, the distributed computing environment 702 operates on, in communication with, or as part of a network 708. One or more client devices 706A-706N (hereinafter referred to collectively and/or generically as "devices 706") can communicate with the distributed computing environment 702 via the network 708 and/or other connections (not illustrated in FIG. 7).

In the illustrated configuration, the devices 706 include: a computing device 706A such as a laptop computer, a desktop computer, or other computing device; a "slate" or tablet computing device ("tablet computing device") 706B; a mobile computing device 706C such as a mobile telephone, a smartphone, or other mobile computing device; a server computer 706D; and/or other devices 706N. It should be understood that any number of devices 706 can communicate with the distributed computing environment 702. Two example computing architectures for the devices 706 are illustrated and described herein with reference to FIGS. 6 and 8. It should be understood that the illustrated client devices 706 and computing architectures illustrated and described herein are illustrative and should not be construed as being limited in any way.

In the illustrated configuration, the distributed computing environment 702 includes application servers 704, data storage 710, and one or more network interfaces 712. According to various implementations, the functionality of the application servers 704 can be provided by one or more server computers that are executing as part of, or in communication with, the network 708. The application servers 704 can host various services such as virtual machines, portals, and/or other resources. In the illustrated configuration, the application servers 704 host one or more virtual machines 714 for hosting applications, such as program components for implementing the functionality described above with regard to FIGS. 1-5. It should be understood that this configuration is illustrative and should not be construed as being limiting in any way. The application servers 704 might also host or provide access to one or more web portals, link pages, websites, and/or other information ("web portals") 716.

According to various implementations, the application servers 704 also include one or more mailbox services 718 and one or more messaging services 720. The mailbox services 718 can include electronic mail ("email") services. The mailbox services 718 can also include various personal information management ("PIM") services including, but not limited to, calendar services, contact management services, collaboration services, and/or other services. The messaging services 720 can include, but are not limited to, instant messaging ("IM") services, chat services, forum services, and/or other communication services.

The application servers 704 can also include one or more social networking services 722. The social networking services 722 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 722 are provided by or include the FACEBOOK social networking service, the LINKEDIN professional networking service, the FOURSQUARE geographic networking service, and the like. In other configurations, the social networking services 722 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 722 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 722 are not mentioned herein for the sake of brevity. As such, the configurations described above are illustrative, and should not be construed as being limited in any way.

As also shown in FIG. 7, the application servers 704 can also host other services, applications, portals, and/or other resources ("other services") 724. These services can include, but are not limited to, streaming video services like the NETFLIX streaming video service and productivity services such as the GMAIL email service from GOOGLE INC. It thus can be appreciated that activities performed by users of the distributed computing environment 702 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 702 can include data storage 710. According to various implementations, the functionality of the data storage 710 is provided by one or more databases operating on, or in communication with, the network 708. The functionality of the data storage 710 can also be provided by one or more server computers configured to host data for the distributed computing environment 702. The data storage 710 can include, host, or provide one or more real or virtual datastores 726A-726N (hereinafter referred to collectively and/or generically as "datastores 726"). The datastores 726 are configured to host data used or created by the application servers 704 and/or other data.

The distributed computing environment 702 can communicate with, or be accessed by, the network interfaces 712. The network interfaces 712 can include various types of network hardware and software for supporting communications between two or more computing devices including, but not limited to, the devices 706 and the application servers 704. It should be appreciated that the network interfaces 712 can also be utilized to connect to other types of networks and/or computer systems.

It should be understood that the distributed computing environment 702 described herein can implement any aspects of the software elements described herein with any number of virtual computing resources and/or other distributed computing functionality that can be configured to execute any aspects of the software components disclosed herein. It should also be understood that the devices 706 can also include real or virtual machines including, but not limited to, server computers, web servers, personal computers, gaming consoles or other types of gaming devices, mobile computing devices, smartphones, and/or other devices. As such, various implementations of the technologies disclosed herein enable any device configured to access the distributed computing environment 702 to utilize the functionality described herein.

Figure 8:
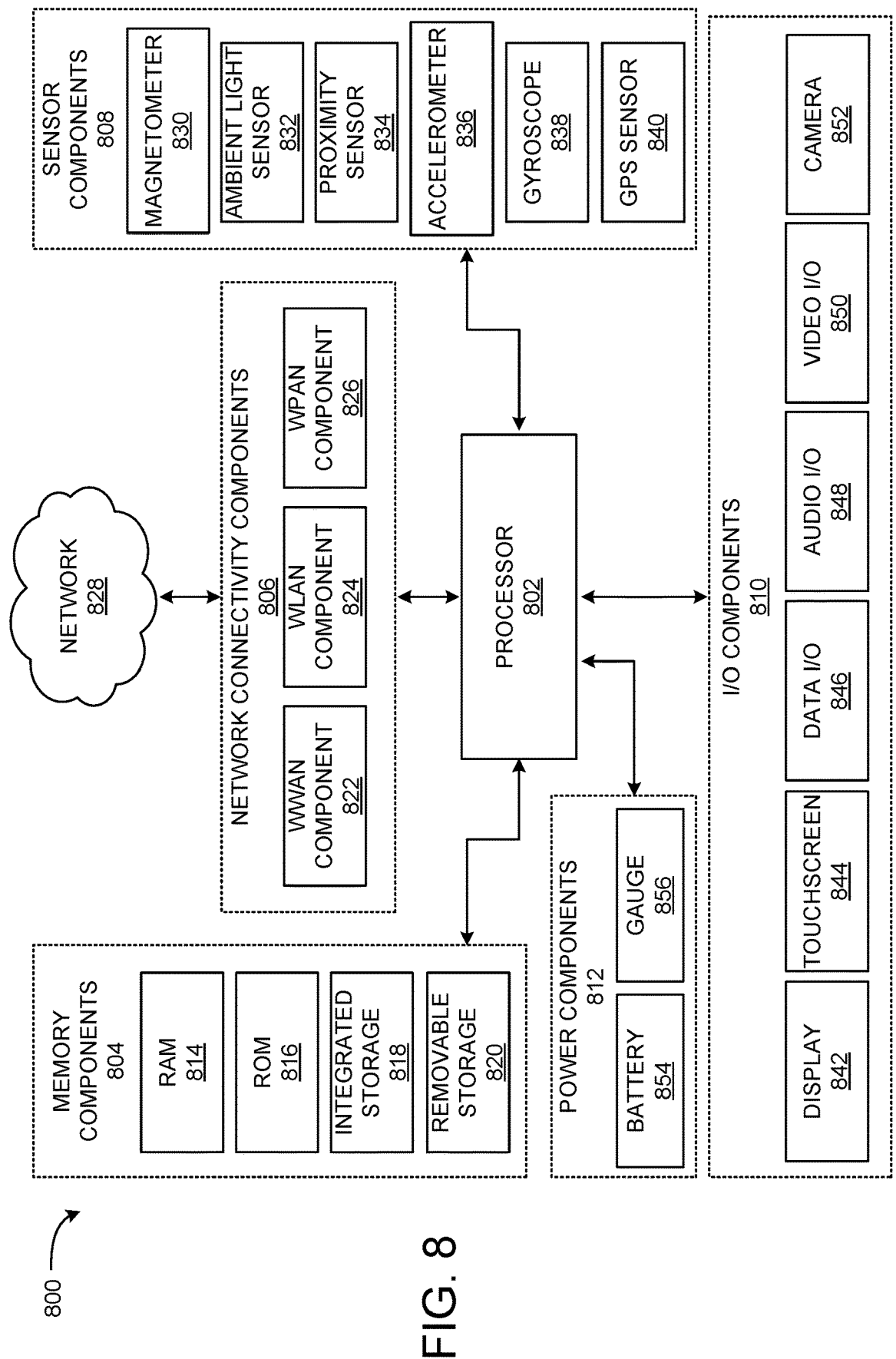
FIG. 8 is a computer architecture diagram illustrating a computing device architecture for a computing device, such as the computing devices shown in FIGS. 1A, 1B, 2 and 3A, that is capable of implementing aspects of the technologies presented herein.

Turning now to FIG. 8, an illustrative computing device architecture 800 will be described for a computing device, such as the automatic access control policy generation system 120 or computing devices 164 illustrated in FIGS. 1A and 1B or some or all of the components of the systems 200 and 300 illustrated in FIGS. 2 and 3A, that is capable of executing the various software components described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 800 is also applicable to any of the devices 706 shown in FIG. 7. Furthermore, aspects of the computing device architecture 800 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, smartphone, or tablet computer devices that utilize a touchscreen or some other touch-enabled device, such as a touch-enabled track pad or touch-enabled mouse. The computing device architecture 800 can also be utilized to implement the automatic access control policy generation system 120 or computing devices 164 illustrated in FIGS. 1A and 1B or some or all of the components of the systems 200 and 300 illustrated in FIGS. 2 and 3A and/or other types of computing devices for implementing or consuming the functionality described herein.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can be connected electrically in order to interact and carry out device functions. In some configurations, the components are arranged so as to communicate via one or more busses (not shown).

The processor 802 includes one or more CPU cores configured to process data, execute computer executable instructions of one or more application programs and to communicate with other components of the computing device architecture 800 in order to perform various functionality described herein. The processor 802 can be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 802 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 802 is, or is included in, a system-on-chip ("SoC") along with one or more of the other components described herein below. For example, the SoC can include the processor 802, a GPU, one or more of the network connectivity components 806, and one or more of the sensor components 808. In some configurations, the processor 802 is fabricated, in part, utilizing a package-on-package ("PoP") integrated circuit packaging technique. Moreover, the processor 802 can be a single core or multi-core processor.

The processor 802 can be created in accordance with an ARM architecture, available for license from ARM HOLDINGS of Cambridge, United Kingdom. Alternatively, the processor 802 can be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a RAM 814, a ROM 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 can be soldered or otherwise connected to a logic board upon which the processor 802 and other components described herein might also be connected. As such, the integrated storage 818 is integrated in the computing device. The integrated storage 818 can be configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 828, which can be a WWAN, a WLAN, or a WPAN. Although a single network 828 is illustrated, the network connectivity components 806 can facilitate simultaneous communication with multiple networks. For example, the network connectivity components 806 can facilitate simultaneous communications with multiple networks via one or more of a WWAN, a WLAN, or a WPAN.

The network 828 can be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 828 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 828 can be configured to provide voice and/or data communications with any combination of the above technologies. The network 828 can be configured or adapted to provide voice and/or data communications in accordance with future generation technologies.

In some configurations, the WWAN component 822 is configured to provide dual-multi-mode connectivity to the network 828. For example, the WWAN component 822 can be configured to provide connectivity to the network 828, wherein the network 828 provides service via GSM and UMTS technologies, or via some other combination of technologies. Alternatively, multiple WWAN components 822 can be utilized to perform such functionality, and/or provide additional functionality to support other non-compatible technologies (i.e., incapable of being supported by a single WWAN component). The WWAN component 822 can facilitate similar connectivity to multiple networks (e.g., a UMTS network and an LTE network).

The network 828 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 828 via the WI-FI access points. Such connections can be secured via various encryption technologies including, but not limited, WI-FI Protected Access ("WPA"), WPA2, Wired Equivalent Privacy ("WEP"), and the like.

The network 828 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 830, an ambient light sensor 832, a proximity sensor 834, an accelerometer 836, a gyroscope 838, and a Global Positioning System sensor ("GPS sensor") 840. It is contemplated that other sensors, such as, but not limited to, temperature sensors or shock detection sensors, might also be incorporated in the computing device architecture 800.

The magnetometer 830 is configured to measure the strength and direction of a magnetic field. In some configurations, the magnetometer 830 provides measurements to a compass application program stored within one of the memory components 804 in order to provide a user with accurate directions in a frame of reference including the cardinal directions, north, south, east, and west. Similar measurements can be provided to a navigation application program that includes a compass component. Other uses of measurements obtained by the magnetometer 830 are contemplated.

The ambient light sensor 832 is configured to measure ambient light. In some configurations, the ambient light sensor 832 provides measurements to an application program stored within one the memory components 804 in order to automatically adjust the brightness of a display (described below) to compensate for low light and bright light environments. Other uses of measurements obtained by the ambient light sensor 832 are contemplated.

The proximity sensor 834 is configured to detect the presence of an object or thing in proximity to the computing device without direct contact. In some configurations, the proximity sensor 834 detects the presence of a user's body (e.g., the user's face) and provides this information to an application program stored within one of the memory components 804 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 834 are contemplated.

The accelerometer 836 is configured to measure proper acceleration. In some configurations, output from the accelerometer 836 is used by an application program as an input mechanism to control some functionality of the application program. In some configurations, output from the accelerometer 836 is provided to an application program for use in switching between landscape and portrait modes, calculating coordinate acceleration, or detecting a fall. Other uses of the accelerometer 836 are contemplated.

The gyroscope 838 is configured to measure and maintain orientation. In some configurations, output from the gyroscope 838 is used by an application program as an input mechanism to control some functionality of the application program. For example, the gyroscope 838 can be used for accurate recognition of movement within a 3D environment of a video game application or some other application. In some configurations, an application program utilizes output from the gyroscope 838 and the accelerometer 836 to enhance user input operations. Other uses of the gyroscope 838 are contemplated.

The GPS sensor 840 is configured to receive signals from GPS satellites for use in calculating a location. The location calculated by the GPS sensor 840 can be used by any application program that requires or benefits from location information. For example, the location calculated by the GPS sensor 840 can be used with a navigation application program to provide directions from the location to a destination or directions from the destination to the location. Moreover, the GPS sensor 840 can be used to provide location information to an external location-based service, such as E911 service. The GPS sensor 840 can obtain location information generated via WI-FI, WIMAX, and/or cellular triangulation techniques utilizing one or more of the network connectivity components 806 to aid the GPS sensor 840 in obtaining a location fix. The GPS sensor 840 can also be used in Assisted GPS ("A-GPS") systems.

The I/O components 810 include a display 842, a touchscreen 844, a data I/O interface component ("data I/O") 846, an audio I/O interface component ("audio I/O") 848, a video I/O interface component ("video I/O") 850, and a camera 852. In some configurations, the display 842 and the touchscreen 844 are combined. In some configurations two or more of the data I/O component 846, the audio I/O component 848, and the video I/O component 850 are combined. The I/O components 810 can include discrete processors configured to support the various interfaces described below or might include processing functionality built-in to the processor 802.

The display 842 is an output device configured to present information in a visual form. In particular, the display 842 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 842 is a liquid crystal display ("LCD") utilizing any active or passive matrix technology and any backlighting technology (if used). In some configurations, the display 842 is an organic light emitting diode ("OLED") display. Other display types are contemplated.

The touchscreen 844 is an input device configured to detect the presence and location of a touch. The touchscreen 844 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 844 is incorporated on top of the display 842 as a transparent layer to enable a user to use one or more touches to interact with objects or other information presented on the display 842. In other configurations, the touchscreen 844 is a touch pad incorporated on a surface of the computing device that does not include the display 842. For example, the computing device can have a touchscreen incorporated on top of the display 842 and a touch pad on a surface opposite the display 842.

In some configurations, the touchscreen 844 is a single-touch touchscreen. In other configurations, the touchscreen 844 is a multi-touch touchscreen. In some configurations, the touchscreen 844 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 844. As such, a developer can create gestures that are specific to a particular application program.

In some configurations, the touchscreen 844 supports a tap gesture in which a user taps the touchscreen 844 once on an item presented on the display 842. The tap gesture can be used for various reasons including, but not limited to, opening or launching whatever the user taps, such as a graphical icon. In some configurations, the touchscreen 844 supports a double tap gesture in which a user taps the touchscreen 844 twice on an item presented on the display 842. The double tap gesture can be used for various reasons including, but not limited to, zooming in or zooming out in stages. In some configurations, the touchscreen 844 supports a tap and hold gesture in which a user taps the touchscreen 844 and maintains contact for at least a pre-defined time. The tap and hold gesture can be used for various reasons including, but not limited to, opening a context-specific menu.

In some configurations, the touchscreen 844 supports a pan gesture in which a user places a finger on the touchscreen 844 and maintains contact with the touchscreen 844 while moving the finger on the touchscreen 844. The pan gesture can be used for various reasons including, but not limited to, moving through screens, images, or menus at a controlled rate. Multiple finger pan gestures are also contemplated. In some configurations, the touchscreen 844 supports a flick gesture in which a user swipes a finger in the direction the user wants the screen to move. The flick gesture can be used for various reasons including, but not limited to, scrolling horizontally or vertically through menus or pages. In some configurations, the touchscreen 844 supports a pinch and stretch gesture in which a user makes a pinching motion with two fingers (e.g., thumb and forefinger) on the touchscreen 844 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 844. As such, the above gestures should be understood as being illustrative and should not be construed as being limiting in any way.

The data I/O interface component 846 is configured to facilitate input of data to the computing device and output of data from the computing device. In some configurations, the data I/O interface component 846 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 848 is configured to provide audio input and/or output capabilities to the computing device. In some configurations, the audio I/O interface component 848 includes a microphone configured to collect audio signals. In some configurations, the audio I/O interface component 848 includes a headphone jack configured to provide connectivity for headphones or other external speakers. In some configurations, the audio interface component 848 includes a speaker for the output of audio signals. In some configurations, the audio I/O interface component 848 includes an optical audio cable out.

The video I/O interface component 850 is configured to provide video input and/or output capabilities to the computing device. In some configurations, the video I/O interface component 850 includes a video connector configured to receive video as input from another device (e.g., a video media player such as a DVD or BLU-RAY player) or send video as output to another device (e.g., a monitor, a television, or some other external display). In some configurations, the video I/O interface component 850 includes a High-Definition Multimedia Interface ("HDMI"), mini-HDMI, micro-HDMI, DisplayPort, or proprietary connector to input/output video content. In some configurations, the video I/O interface component 850 or portions thereof is combined with the audio I/O interface component 848 or portions thereof.

The camera 852 can be configured to capture still images and/or video. The camera 852 can utilize a charge coupled device ("CCD") or a complementary metal oxide semiconductor ("CMOS") image sensor to capture images. In some configurations, the camera 852 includes a flash to aid in taking pictures in low-light environments. Settings for the camera 852 can be implemented as hardware or software buttons.

Although not illustrated, one or more hardware buttons can also be included in the computing device architecture 800. The hardware buttons can be used for controlling some operational aspect of the computing device. The hardware buttons can be dedicated buttons or multi-use buttons. The hardware buttons can be mechanical or sensor-based.

The illustrated power components 812 include one or more batteries 854, which can be connected to a battery gauge 856. The batteries 854 can be rechargeable or disposable. Rechargeable battery types include, but are not limited to, lithium polymer, lithium ion, nickel cadmium, and nickel metal hydride. Each of the batteries 854 can be made of one or more cells.

The battery gauge 856 can be configured to measure battery parameters such as current, voltage, and temperature. In some configurations, the battery gauge 856 is configured to measure the effect of a battery's discharge rate, temperature, age and other factors to predict remaining life within a certain percentage of error. In some configurations, the battery gauge 856 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 812 can also include a power connector (not shown), which can be combined with one or more of the aforementioned I/O components 810. The power components 812 can interface with an external power system or charging equipment via a power I/O component 810. Other configurations can also be utilized.

The disclosure presented herein also encompasses the subject matter set forth in the following clauses:

Clause 1. A computer-implemented method for generating access control rules for controlling access to computer resources, the method comprising: collecting historical access data for user accesses to a computer resource; separating the historical access data into a training data set and a validation data set; generating an access control rule for the computer resource based on one or more properties of the user accesses to the computer resource in the training data set; validating the access control rule against the validation data set, where the access control rule is determined to be valid if a denial rate level obtained from applying the access control rule to the validation data set is below a threshold parameter value; and if the access control rule is determined to be valid, providing the access control rule to an administrative interface.

Clause 2. The computer-implemented method of Clause 1, where the step of validating the access control rule against the validation data set, where the access control rule is determined to be valid if a denial rate level obtained from applying the access control rule to the validation data set is below a threshold parameter value comprises: applying the access control rule to user access requests in the validation data set that are directed toward the computer resource to obtain the denial rate level; comparing the denial rate level to the threshold parameter value; and determining that the access control rule is valid if the denial rate level is below the threshold parameter value.

Clause 3. The computer-implemented method of Clause 1, where the step of validating the access control rule against the validation data set, where the access control rule is determined to be valid if a denial rate level obtained from applying the access control rule to the validation data set is below a threshold parameter value comprises: applying the access control rule to user access requests in a plurality of subsets of the validation data set that are directed toward the computer resource to obtain a denial rate level for each subset of the plurality of subsets; scoring the denial rate level for each subset of the plurality of subsets to a corresponding one of a plurality of threshold parameter values to a score for each subset of the plurality of subsets; collecting the scores for each subset of the plurality of subsets to determine a cumulative score; and determining that the access control rule is valid if the cumulative score is below a threshold score value.

Clause 4. The computer-implemented method of Clause 1, where the threshold parameter value is determined by one or more of a preset value, an algorithmically determined value, and a value received from an administrator.

Clause 5. The computer-implemented method of Clause 1, the method further comprising: receiving a selection message from the administrative interface, the selection message indicating selection of the access control rule; and responsive to the selection message, storing the access control rule in an access rules store.

Clause 6. The computer-implemented method of Clause 5, the method further comprising: receiving a user access request for the computer resource; obtaining the access control rule for the computer resource from the access rules store; applying the access control rule to the received user access request to determine if one or more properties of the received user access request fall within one or more permitted parameters of the access control rule; permitting the user access request if the one or more properties of the received user access request fall within the one or more permitted parameters of the access control rule; and rejecting the user access request if the one or more properties of the received user access request do not fall within the one or more permitted parameters of the access control rule.

Clause 7. The computer-implemented method of Clause 1, where generating an access control rule for the computer resource based on one or more properties of the user accesses to the computer resource in the training data set further comprises generating the access control rule for the computer resource based on analysis of the one or more properties of the user accesses to the computer resource in the training data set utilizing one or more of machine learning, statistical analysis, Bayesian analysis, histographical analysis, and clustering of user characteristics.

Clause 8. An automatic access control policy generation system, the automatic access control policy generation system comprising: one or more processors; and at least one computer storage medium having computer executable instructions stored thereon which, when executed by the one or more processors, cause the one or more processors to: collect historical access data for user accesses to a computer resource; separate the historical access data into a training data set and a validation data set; generate an access control rule for the computer resource based on one or more properties of the user accesses to the computer resource in the training data set; validate the access control rule against the validation data set, where the access control rule is determined to be valid if a denial rate level obtained from applying the access control rule to the validation data set is below a threshold parameter value; and if the access control rule is determined to be valid, provide the access control rule to an administrative interface.

Clause 9. The automatic access control policy generation system of Clause 8, where the operation to validate the access control rule against the validation data set, where the access control rule is determined to be valid if a denial rate level obtained from applying the access control rule to the validation data set is below a threshold parameter value comprises: apply the access control rule to user access requests in the validation data set that are directed toward the computer resource to obtain the denial rate level; compare the denial rate level to the threshold parameter value; and determine that the access control rule is valid if the denial rate level is below the threshold parameter value.

Clause 10. The automatic access control policy generation system of Clause 8, where the operation to validate the access control rule against the validation data set, where the access control rule is determined to be valid if a denial rate level obtained from applying the access control rule to the validation data set is below a threshold parameter value comprises: apply the access control rule to user access requests in a plurality of subsets of the validation data set that are directed toward the computer resource to obtain a denial rate level for each subset of the plurality of subsets; score the denial rate level for each subset of the plurality of subsets to a corresponding one of a plurality of threshold parameter values to a score for each subset of the plurality of subsets; collect the scores for each subset of the plurality of subsets to determine a cumulative score; and determine that the access control rule is valid if the cumulative score is below a threshold score value.

Clause 11. The automatic access control policy generation system of Clause 8, where the threshold parameter value is determined by one or more of a preset value, an algorithmically determined value, and a value received from an administrator.

Clause 12. The automatic access control policy generation system of Clause 8, where the system is further configured to: receive a selection message from the administrative interface, the selection message indicating selection of the access control rule; and responsive to the selection message, store the access control rule in an access rules store.

Clause 13. The automatic access control policy generation system of Clause 12, where the system is further configured to: receive a user access request for the computer resource; obtain the access control rule for the computer resource from the access rules store; apply the access control rule to the received user access request to determine if one or more properties of the received user access request fall within one or more permitted parameters of the access control rule; permit the user access request if the one or more properties of the received user access request fall within the one or more permitted parameters of the access control rule; and reject the user access request if the one or more properties of the received user access request do not fall within the one or more permitted parameters of the access control rule.

Clause 14. The automatic access control policy generation system of Clause 8, where the operation to generate an access control rule for the computer resource based on one or more properties of the user accesses to the computer resource in the training data set further comprises generating the access control rule for the computer resource based on analysis of the one or more properties of the user accesses to the computer resource in the training data set utilizing one or more of machine learning, statistical analysis, Bayesian analysis, histographical analysis, and clustering of user characteristics.

Clause 15. A computer storage medium having computer executable instructions stored thereon which, when executed by one or more processors, cause the processors to execute a method for generating access control rules for controlling access to computer resources, the method comprising: collecting historical access data for user accesses to a computer resource; separating the historical access data into a training data set and a validation data set; generating an access control rule for the computer resource based on one or more properties of the user access to the computer resource in the training data set; validating the access control rule against the validation data set, where the access control rule is determined to be valid if a denial rate level obtained from applying the access control rule to the validation data set is below a threshold parameter value; and if the access control rule is determined to be valid, providing the access control rule to an administrative interface.

Clause 16. The computer storage medium of Clause 15, where the step of validating the access control rule against the validation data set, where the access control rule is determined to be valid if a denial rate level obtained from applying the access control rule to the validation data set is below a threshold parameter value comprises: applying the access control rule to user access requests in the validation data set that are directed toward the computer resource to obtain the denial rate level; comparing the denial rate level to the threshold parameter value; and determining that the access control rule is valid if the denial rate level is below the threshold parameter value.

Clause 17. The computer storage medium of Clause 15, where the step of validating the access control rule against the validation data set, where the access control rule is determined to be valid if a denial rate level obtained from applying the access control rule to the validation data set is below a threshold parameter value comprises: applying the access control rule to user access requests in a plurality of subsets of the validation data set that are directed toward the computer resource to obtain a denial rate level for each subset of the plurality of subsets; scoring the denial rate level for each subset of the plurality of subsets to a corresponding one of a plurality of threshold parameter values to a score for each subset of the plurality of subsets, where the score for each subset of the plurality of subsets has a corresponding weighting; collecting the scores for each subset of the plurality of subsets to determine a cumulative score; and determining that the access control rule is valid if the cumulative score is below a threshold score value.

Clause 18. The computer storage medium of Clause 17, wherein: a first subset of the plurality of subsets corresponds to user accesses by an individual user; and a second subset of the plurality of subsets corresponds to user accesses by user in a domain that includes the individual user.

Clause 19. The computer storage medium of Clause 15, wherein: the training data set comprises user access requests collected during a first time period; the validation data set comprises user access requests collected during a second time period; and the first time period is earlier than the second time period.

Clause 20. The computer storage medium of Clause 15, the method further comprising: receiving a selection message from the administrative interface, the selection message indicating selection of the access control rule and including one or more modifications to the access control rule; and responsive to the selection message, storing the access control rule with the one or more modifications in an access rules store.

Based on the foregoing, it should be appreciated that an automatic access control policy generation approach has been disclosed that improves security by automatically generating access control rules based on historical access data that limit access to a computer resource to users who have historically accessed the computer resource. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for generating access control rules for controlling access to computer resources, the method comprising:
    collecting historical access data for user accesses to a computer resource using an access control policy generation system;
    separating the historical access data into a training data set and a validation data set using the access control policy generation system;
    generating an access control rule for the computer resource based on one or more properties of the user accesses to the computer resource in the training data set;
    validating the access control rule against the validation data set prior to a deployment of the access control rule, where the access control rule is determined to be valid if a denial rate level obtained from applying the access control rule to the validation data set is below a threshold parameter value, wherein the validation data set is a subset of the historical access data, where the access control rule is determined to be valid if a denial rate level obtained from applying the access control rule to the validation data set is below a threshold parameter value comprises applying the access control rule to user access requests in a plurality of subsets of the validation data set that are directed toward the computer resource to obtain a denial rate level for each subset of the plurality of subsets, scoring the denial rate level for each subset of the plurality of subsets to a corresponding one of a plurality of threshold parameter values to a score for each subset of the plurality of subsets, collecting the scores for each subset of the plurality of subsets to determine a cumulative score; and determining that the access control rule is valid if the cumulative score is below a threshold score value; and
    if the access control rule is determined to be valid, providing the access control rule to an administrative interface for deployment to the computer resource.

2. The computer-implemented method of claim 1, where the step of validating the access control rule against the validation data set, where the access control rule is determined to be valid if a denial rate level obtained from applying the access control rule to the validation data set is below a threshold parameter value comprises:
    applying the access control rule to user access requests in the validation data set that are directed toward the computer resource to obtain the denial rate level;
    comparing the denial rate level to the threshold parameter value; and
    determining that the access control rule is valid if the denial rate level is below the threshold parameter value.

3. The computer-implemented method of claim 1, where the threshold parameter value is determined by one or more of a preset value, an algorithmically determined value, and a value received from an administrator.

4. The computer-implemented method of claim 1, the method further comprising:
    receiving a user access request for the computer resource;
    obtaining the access control rule for the computer resource from the access rules store; applying the access control rule to the received user access request to determine if one or more properties of the received user access request fall within one or more permitted parameters of the access control rule;
    permitting the user access request if the one or more properties of the received user access request fall within the one or more permitted parameters of the access control rule; and
    rejecting the user access request if the one or more properties of the received user access request do not fall within the one or more permitted parameters of the access control rule.

5. The computer-implemented method of claim 1, where generating an access control rule for the computer resource based on one or more properties of the user accesses to the computer resource in the training data set further comprises generating the access control rule for the computer resource based on analysis of the one or more properties of the user accesses to the computer resource in the training data set utilizing one or more of machine learning, statistical analysis, Bayesian analysis, histographical analysis, and clustering of user characteristics.

6. The computer-implemented method of claim 1, wherein the properties of user accesses comprise one or more of, a number of accesses, a date and time, a user identification, and an organization or department.

7. The computer-implemented method of claim 1 wherein the access control rule comprises an action permission level for a user identifier associated with a user accessing the computer resource.

8. The computer-implemented method of claim 1 wherein the access control rule comprises a predefined time period during which access to the computing resource is permitted.

9. An automatic access control policy generation system, the automatic access control policy generation system comprising:
one or more processors; and
at least one computer storage medium having computer executable instructions stored thereon which, when executed by the one or more processors, cause the one or more processors to:
collect historical access data for user accesses to a computer resource using the automatic access control policy generation system:
separate the historical access data into a training data set and a validation data set using the automatic access control policy generation system:
generate an access control rule for the computer resource based on one or more properties of the user accesses to the computer resource in the training data set;
validate the access control rule against the validation data set prior to a deployment of the access control rule, where the access control rule is determined to be valid if a denial rate level obtained from applying the access control rule to the validation data set is below a threshold parameter value, wherein the validation data set is a subset of the historical access data; and where the access control rule is determined to be valid if a denial rate level obtained from applying the access control rule to the validation data set is below a threshold parameter value comprises applying the access control rule to user access requests in a plurality of subsets of the validation data set that are directed toward the computer resource to obtain a denial rate level for each subset of the plurality of subsets, scoring the denial rate level for each subset of the plurality of subsets to a corresponding one of a plurality of threshold parameter values to a score for each subset of the plurality of subsets, collecting the scores for each subset of the plurality of subsets to determine a cumulative score; and determining that the access control rule is valid if the cumulative score is below a threshold score value; and
if the access control rule is determined to be valid, provide the access control rule to an administrative interface for deployment to the computer resource.

10. The automatic access control policy generation system of claim 9, where the operation to validate the access control rule against the validation data set, where the access control rule is determined to be valid if a denial rate level obtained from applying the access control rule to the validation data set is below a threshold parameter value comprises:
apply the access control rule to user access requests in a plurality of subsets of the validation data set that are directed toward the computer resource to obtain a denial rate level for each subset of the plurality of subsets;
score the denial rate level for each subset of the plurality of subsets to a corresponding one of a plurality of threshold parameter values to a score for each subset of the plurality of subsets;
collect the scores for each subset of the plurality of subsets to determine a cumulative score; and
determine that the access control rule is valid if the cumulative score is below a threshold score value.

11. The automatic access control policy generation system of claim 9, where the threshold parameter value is determined by one or more of a preset value, an algorithmically determined value, and a value received from an administrator.

12. The automatic access control policy generation system of claim 9, where the system is further configured to:
receive a user access request for the computer resource;
obtain the access control rule for the computer resource from the access rules store;
apply the access control rule to the received user access request to determine if one or more properties of the received user access request fall within one or more permitted parameters of the access control rule;
permit the user access request if the one or more properties of the received user access request fall within the one or more permitted parameters of the access control rule; and
reject the user access request if the one or more properties of the received user access request do not fall within the one or more permitted parameters of the access control rule.

13. A computer storage medium having computer executable instructions stored thereon which, when executed by one or more processors, cause the processors to execute a method for generating access control rules for controlling access to computer resources, the method comprising:
collecting historical access data for user accesses to a computer resource using an access control policy generation system:
separating the historical access data into a training data set and a validation data set using the access control policy generation system:
generating an access control rule for the computer resource based on one or more properties of the user access to the computer resource in the training data set;
validating the access control rule against the validation data set prior to a deployment of the access control rule, where the access control rule is determined to be valid if a denial rate level obtained from applying the access control rule to the validation data set is below a threshold parameter value, wherein the validation data set is a subset of the historical access data; and
where the access control rule is determined to be valid if a denial rate level obtained from applying the access control rule to the validation data set is below a threshold parameter value comprises applying the access control rule to user access requests in a plurality of subsets of the validation data set that are directed toward the computer resource to obtain a denial rate level for each subset of the plurality of subsets, scoring the denial rate level for each subset of the plurality of subsets to a corresponding one of a plurality of threshold parameter values to a score for each subset of the plurality of subsets, collecting the scores for each subset of the plurality of subsets to determine a cumulative score; and determining that the access control rule is valid if the cumulative score is below a threshold score value; and
if the access control rule is determined to be valid, providing the access control rule to an administrative interface for deployment to the computer resource.

14. The computer storage medium of claim 13, where the step of validating the access control rule against the validation data set, where the access control rule is determined to be valid if a denial rate level obtained from applying the access control rule to the validation data set is below a threshold parameter value comprises:
  applying the access control rule to user access requests in a plurality of subsets of the validation data set that are directed toward the computer resource to obtain a denial rate level for each subset of the plurality of subsets;
  scoring the denial rate level for each subset of the plurality of subsets to a corresponding one of a plurality of threshold parameter values to a score for each subset of the plurality of subsets, where the score for each subset of the plurality of subsets has a corresponding weighting;
  collecting the scores for each subset of the plurality of subsets to determine a cumulative score; and
  determining that the access control rule is valid if the cumulative score is below a threshold score value.

15. The computer storage medium of claim 14, wherein:
a first subset of the plurality of subsets corresponds to user accesses by an individual user; and
a second subset of the plurality of subsets corresponds to user accesses by user in a domain that includes the individual user.

16. The computer storage medium of claim 13, wherein:
the training data set comprises user access requests collected during a first time period;
the validation data set comprises user access requests collected during a second time period; and
the first time period is earlier than the second time period.

17. The computer storage medium of claim 13, the method further comprising:
  receiving a selection message from the administrative interface, the selection message indicating selection of the access control rule and including one or more modifications to the access control rule; and
  responsive to the selection message, storing the access control rule with the one or more modifications in an access rules store.

* * * * *